United States Patent
Liu

(10) Patent No.: US 12,048,882 B2
(45) Date of Patent: Jul. 30, 2024

(54) APPARATUS, SYSTEM, AND METHOD FOR CONTROLLING A COMPUTING DEVICE INTERACTION USING AN ACCESSORY

(71) Applicant: HYTTO PTE. LTD, Singapore (SG)

(72) Inventor: Dan Liu, Guangdong (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/399,708

(22) Filed: Dec. 29, 2023

(65) Prior Publication Data

US 2024/0123357 A1 Apr. 18, 2024

Related U.S. Application Data

(63) Continuation-in-part of application No. 18/350,923, filed on Jul. 12, 2023, now Pat. No. 11,931,308, and a continuation-in-part of application No. 18/208,777, filed on Jun. 12, 2023, which is a continuation of application No. 17/877,770, filed on Jul. 29, 2022, now Pat. No. 11,712,397, application No. 18/399,708 is a continuation-in-part of application No.
(Continued)

(51) Int. Cl.
*A63F 13/80* (2014.01)
*A61H 19/00* (2006.01)
*A63F 13/285* (2014.01)
*A63F 13/40* (2014.01)
*G06N 3/04* (2023.01)
*G06N 3/08* (2023.01)

(52) U.S. Cl.
CPC ............ *A63F 13/80* (2014.09); *A61H 19/32* (2013.01); *A61H 19/44* (2013.01); *A63F 13/285* (2014.09); *A63F 13/40* (2014.09); *A61H 2201/5012* (2013.01); *A63F 2300/302* (2013.01); *A63F 2300/53* (2013.01); *A63F 2300/8094* (2013.01); *G06N 3/04* (2013.01); *G06N 3/08* (2013.01)

(58) Field of Classification Search
CPC ........ A61H 19/32; A61H 19/44; A63F 13/285
See application file for complete search history.

(56) References Cited

U.S. PATENT DOCUMENTS

| 3,361,130 A | 1/1968 | Rowe |
| 5,807,287 A | 9/1998 | Cheng |
| 6,277,085 B1 | 8/2001 | Flynn |

(Continued)

FOREIGN PATENT DOCUMENTS

| CN | 1277402 A | 12/2000 |
| KR | 101256565 B1 | 4/2013 |

(Continued)

OTHER PUBLICATIONS

"Lovense launches Mission—A G-spot Depth-Controlled Vibrator", URL: https://lovensefan.com/lovense-mission-launch/ pp. 1-4, accessed on Jul. 27, 2022.

*Primary Examiner* — Kaylee R Wilson
(74) *Attorney, Agent, or Firm* — Holtz, Holtz & Volek PC

(57) ABSTRACT

A method includes selecting a computing device interaction, configuring a user accessory based on the selected computing device interaction, and performing the computing device interaction using the configured user accessory. The method also includes quantifying a computing device interaction performance of one or more users and controlling the user accessory based on quantifying the computing device interaction performance. A body part of one of the one or more users is inserted into or received by the user accessory.

20 Claims, 16 Drawing Sheets

Related U.S. Application Data

16/290,085, filed on Mar. 1, 2019, now Pat. No. 11,896,911.

(56) References Cited

U.S. PATENT DOCUMENTS

| | | |
|---|---|---|
| 6,368,268 B1 | 4/2002 | Sandvick et al. |
| 8,043,149 B2 | 10/2011 | Ortiz et al. |
| 8,255,299 B2 | 8/2012 | Cambridge |
| 8,465,353 B2 | 6/2013 | Ishii et al. |
| 8,644,967 B2 | 2/2014 | Seiler |
| 8,936,544 B2 | 1/2015 | Shahoian et al. |
| 9,762,515 B1 | 9/2017 | Olivares et al. |
| 10,051,328 B2 | 8/2018 | Olivares et al. |
| 10,218,795 B1 | 2/2019 | Messinger |
| 10,576,013 B1 | 3/2020 | Sloan |
| 11,134,041 B1 | 9/2021 | He |
| 11,311,453 B2 | 4/2022 | Liu |
| 2002/0065477 A1 | 5/2002 | Boyd et al. |
| 2002/0133103 A1 | 9/2002 | Williams et al. |
| 2003/0036678 A1 | 2/2003 | Abbassi |
| 2004/0082831 A1 | 4/2004 | Kobashikawa et al. |
| 2004/0097852 A1 | 5/2004 | Boyd et al. |
| 2005/0138560 A1 | 6/2005 | Lee et al. |
| 2006/0079732 A1 | 4/2006 | Blumenthal |
| 2006/0247561 A1 | 11/2006 | Chiu |
| 2012/0259171 A1 | 10/2012 | Shmakov |
| 2012/0304216 A1 | 11/2012 | Strong |
| 2013/0165747 A1 | 6/2013 | Maggs |
| 2014/0011557 A1 | 1/2014 | Coyle |
| 2014/0155690 A1 | 6/2014 | Morton |
| 2015/0057493 A1 | 2/2015 | Harris et al. |
| 2016/0049043 A1 | 2/2016 | Tennenhaus et al. |
| 2017/0095207 A1 | 4/2017 | Thomas et al. |
| 2017/0119619 A1 | 5/2017 | Dills |
| 2017/0296424 A1 | 10/2017 | Hsieh et al. |
| 2018/0116904 A1 | 5/2018 | Lieberman et al. |
| 2018/0315327 A1 | 11/2018 | Kozloski et al. |
| 2019/0133877 A1 | 5/2019 | Cambridge |
| 2020/0009009 A1 | 1/2020 | Nishida |
| 2020/0276504 A1 | 9/2020 | Liu |
| 2020/0289363 A1 | 9/2020 | Liu |
| 2020/0315908 A1 | 10/2020 | Liu |
| 2020/0366972 A1 | 11/2020 | Sloan |
| 2021/0341992 A1 | 11/2021 | Cambridge |
| 2022/0141550 A1 | 5/2022 | Liu |
| 2022/0296460 A1 | 9/2022 | Liu et al. |

FOREIGN PATENT DOCUMENTS

| | | |
|---|---|---|
| WO | 2006040750 A1 | 4/2006 |
| WO | 2008067487 A2 | 6/2008 |
| WO | 2015009626 A1 | 1/2015 |

APPARATUS, SYSTEM, AND METHOD FOR CONTROLLING A COMPUTING DEVICE INTERACTION USING AN ACCESSORY

CROSS REFERENCE TO RELATED APPLICATIONS

This application is a Continuation Application of U.S. application Ser. No. 16/290,085, filed Mar. 1, 2019. This application is also a Continuation-in-Part of U.S. patent application Ser. No. 18/208,777, filed Jun. 12, 2023, which is a Continuation of U.S. patent application Ser. No. 17/877,770, filed Jul. 29, 2022, and issued as U.S. Pat. No. 11,712,397 on Aug. 1, 2023. This application is also a Continuation-in-Part of U.S. patent application Ser. No. 18/350,923, filed Jul. 12, 2023. Each of the above applications is hereby incorporated by reference in its entirety.

FIELD OF THE INVENTION

The present disclosure generally relates to an apparatus, system, and method for controlling a computing device interaction, and more particularly to an apparatus, system, and method for controlling a computing device interaction using an accessory.

BACKGROUND OF THE INVENTION

Conventional game systems such as video games typically involve controlling aspects of the game using a handheld controller. Such conventional controllers typically include buttons, levers, or other interface features designed to be manipulated by a user's fingers.

One disadvantage with conventional video game controllers is that interaction and stimulation using the controller and game centers on a player's hands. For example, feedback from conventional game systems typically focuses on a player's hands. This shortcoming may negatively affect a user's enjoyment of certain one-player or multiplayer games by focusing controller interaction to a user's hands.

The exemplary disclosed system and method are directed to overcoming one or more of the shortcomings set forth above and/or other deficiencies in existing technology.

SUMMARY OF THE INVENTION

In one exemplary aspect, the present disclosure is directed to a method. The method includes selecting a computing device interaction, configuring a user accessory based on the selected computing device interaction, and performing the computing device interaction using the configured user accessory. The method also includes quantifying a computing device interaction performance of one or more users and controlling the user accessory based on quantifying the computing device interaction performance. A body part of one of the one or more users is inserted into or received by the user accessory.

In another aspect, the present disclosure is directed to a system. The system includes a game module, comprising computer-executable code stored in non-volatile memory, a processor, and a user accessory. The game module, the processor, and the user accessory are configured to receive user input data selecting a video game, configure the user accessory based on the selected video game, provide user control of a video game character based on user input data provided via the configured user accessory, quantify game performance of a first user and a second user, and control the user accessory based on quantifying the game performance. A genital body part of the first user is inserted into or received by the user accessory.

DETAILED DESCRIPTION AND INDUSTRIAL APPLICABILITY

Figure 1:
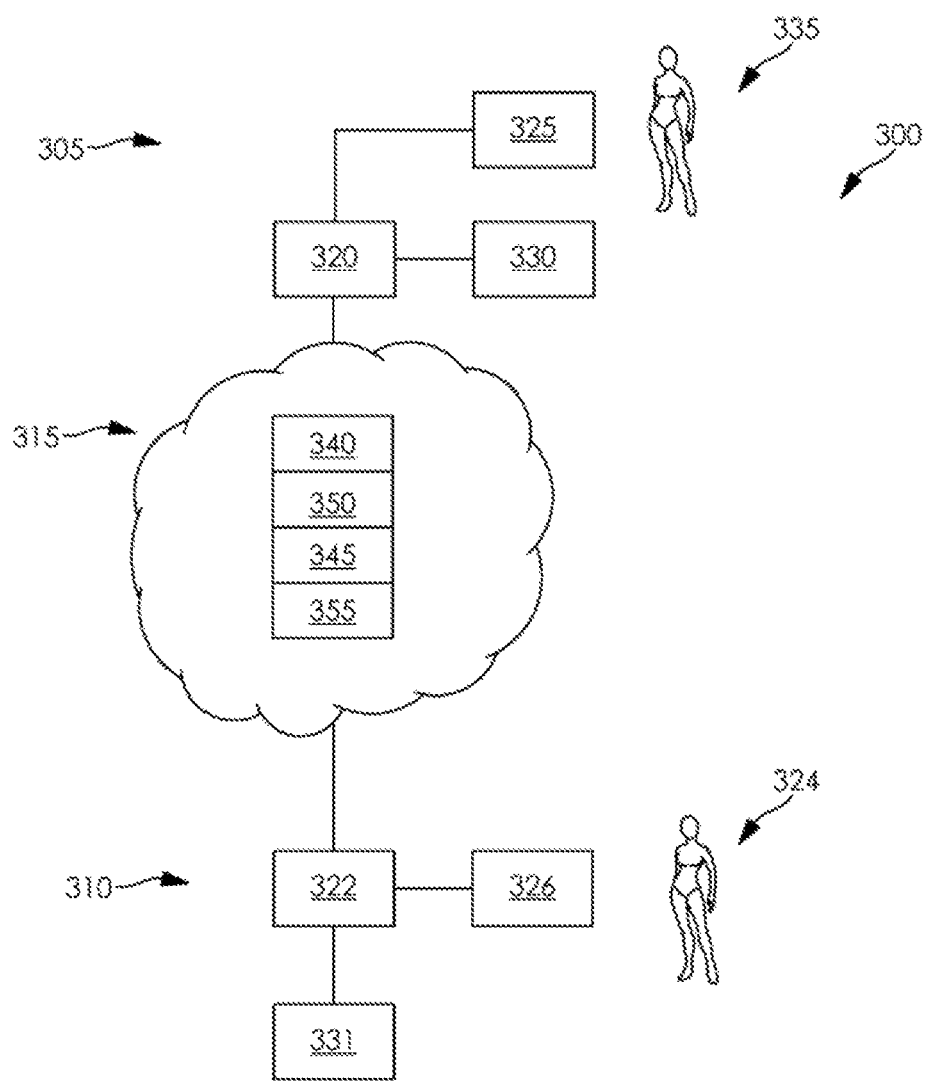
FIG. 1 is a schematic illustration of an exemplary system of the present invention.

FIG. 1 illustrates an exemplary system 300 for controlling a computing device interaction using an accessory. For example, system 300 may be used in any suitable application controlling a game such as a video game using an accessory. For example, system 300 may be used in any suitable application for controlling a game such as a video game displayed on a user interface, a virtual reality video game, and/or any other game played on a computing device or other suitable user interface. In at least some exemplary embodiments, system 300 may be used in an erotic game such as an erotic video game. System 300 may also be used in any other suitable computing device interaction such as virtual physical therapy, virtual medical clinical work or appointments, virtual massage, and/or any other suitable type of computing device interaction involving tactile contact or stimulation of a body portion.

As illustrated in FIG. 1, system 300 may include a model subsystem 305, a user subsystem 310, and a server subsystem 315. Server subsystem 315 may receive, transmit, and/or exchange data such as user input and image data with model subsystem 305 and user subsystem 310.

As illustrated in FIG. 1, model subsystem 305 may include a model device 320, a personal device 325, and an accessory 330 that may be operated and/or utilized by a user (e.g., a model 335). Model device 320 may receive, transmit, and/or exchange data such as user input and control data with personal device 325 and accessory 330.

Model device 320 may be any suitable device for interfacing with other components of system 300 such as a computing device (e.g., user interface). For example, model device 320 may be any suitable user interface for receiving input and/or providing output (e.g., image data) to model 335 and/or server subsystem 315. Model device 320 may be, for example, a touchscreen device (e.g., of a smartphone, a tablet, a smartboard, and/or any suitable computer device), a computer keyboard and monitor (e.g., desktop or laptop), an audio-based device for entering input and/or receiving output via sound, a tactile-based device for entering input and receiving output based on touch or feel, a dedicated user interface designed to work specifically with other components of system 300, and/or any other suitable user interface (e.g., including components and/or configured to work with components described below regarding FIGS. 22 and 23). For example, model device 320 may include a touchscreen device of a smartphone or handheld tablet. For example, model device 320 may include a display (e.g., a computing device display, a touchscreen display, and/or any other suitable type of display) that may provide output, image data, and/or any other desired output or input prompt to a user. For example, the exemplary display may include a graphical user interface to facilitate entry of input by a user and/or receiving output such as image data.

Personal device 325 may be any suitable device that may provide personal data regarding a user (e.g., model 335). In at least some exemplary embodiments, personal device 325 may be a smartphone, tablet, or any other suitable handheld personal device. For example, personal device 325 may be a smart device that may or may not be wearable by a user such as a smartwatch, smart glasses or goggles, a virtual reality goggles, a recording device, and/or any other suitable personal device that may be in communication with model device 320, accessory 330, and/or any other suitable component of system 300. In at least some exemplary embodiments, personal device 325 may be a wearable biometric device that may measure any suitable parameter of a user (e.g., model 335) such as movement, heart rate, body temperature, blood pressure, and/or any other desired physical metric of a user. Personal device 325 may measure characteristics of a user, record data of ambient conditions that a user is experiencing (e.g., ambient temperature, barometric pressure, humidity, and/or other suitable ambient conditions), may record data of conditions surrounding a user (e.g., audio and/or image data), and/or any may sense and record any other desired data.

Accessory 330 may be any suitable accessory for use by a user (e.g., model 335). For example, accessory 330 may be fit over or within a body portion of a user (e.g., including a hand, foot, genitalia, head, waist, and/or any other desired portion). Accessory 330 may be for example a sex toy. In at least some exemplary embodiments, accessory 330 may include a cavity configured to receive a genital body part (e.g., a penis) of a user. For example, accessory 330 may be a genital body part sleeve (e.g., a penis sleeve) or a genital body part extension (e.g., a penis extension). Also for example, accessory 330 may be configured to be received within a genital body part (e.g., a vagina) of a user. For example, accessory 330 may be a dildo.

Accessory 330 may also include electrical, mechanical, vibrational, hydraulic, pneumatic, and/or any other desired type of component for actuating or powering accessory 330. For example, accessory 330 may include electrical and/or mechanical components that vibrate accessory 330. Accessory 330 may also include hydraulic, pneumatic, electrical, mechanical, and/or other suitable types of components for increasing or decreasing a size of accessory 330. Accessory 330 may include an inflatable housing or other types of mechanical components that may selectively increase or decrease in size. Accessory 330 may include electrical components that may selectively be controlled by system 330 to release an electrical charge (e.g., may selectively deliver a mild electrical shock). Accessory 330 may also include thermal components that may selectively transfer heat or cold to a user in contact with or wearing accessory 330. Accessory 330 may include actuatable tactile components that may selectively rub or massage a body part of a user.

Accessory 330 may also include electrical, mechanical, vibrational, hydraulic, pneumatic, and/or any other desired type of component for receiving motion-based input from a user. For example, portions of accessory 330 may translate and/or rotate relatively to each other to allow a user to use relative motion of different components of accessory 330 to generate control data that may be transferred to server subsystem 315 (e.g., directly transferred and/or transferred via model device 320). Accessory 330 may include communication components such as transmitters and receivers for transmitting and receiving data such as control data (e.g., input from a user) and data transferred from server subsystem 315 and other suitable components of system 300 to control accessory 330 (e.g., control a movement, vibration, temperature, electrical transmission, change in size, and/or any other function of accessory 330).

Accessory 330 may be in communication with model device 320. For example, accessory 330 may be in wireless communication (e.g., or via cord or other connection) to exchange data with model device 320 based on an operation of system 300. Accessory 330 may also be in communication with any other suitable component of system 300 such as components of server subsystem 315 and/or user subsystem 310. System 300 may thereby transmit data to and/or receive data from accessory 330 to control an operation of accessory 330.

As illustrated in FIG. 1, user subsystem 310 may include a user device 322 that may be a similar device to model device 320. User device 322 may provide a user 324 with output such as image data and other desired output and/or input prompts for providing input to system 300. User device 322 may transmit, receive, and exchange data with server subsystem 315. User subsystem 310 may also include a personal device 326 that may be similar to personal device 325, and an accessory 331 that may be similar to accessory 330. It is also contemplated that user device 322 may communicate directly with any other suitable component of system 300 such as model device 320, personal device 325, and/or accessory 330 (e.g., and that model device 320 may similarly communicate directly with user device 322, personal device 326, and accessory 331).

As illustrated in FIG. 1, server subsystem 315 may include components similar to the exemplary computing device and network components described below regarding FIGS. 22 and 23. For example, server subsystem 315 may include one or more modules having computer-executable code stored in non-volatile memory. Server subsystem 315 may also include a processor for processing data associated with system 300 as disclosed herein that may be partially or substantially entirely integrated into any component (e.g., or combination of components) of system 300. Server subsystem 315 may for example include a game setting module 340, a game instruction module 345, a game result module 350, and a game communication module 355, which may operate in conjunction with the other components of server subsystem 315, model subsystem 305, and user subsystem 310 as described for example herein. Game setting module 340, game instruction module 345, game result module 350, and game communication module 355 may each be a separate module or may be integrated into one or more exemplary modules (e.g., one or more computing device interaction modules such as a game module). Server subsystem 315 may include any suitable modules for example for controlling a game such as a video game displayed on a user interface, controlling a virtual reality video game or any other game played on a computing device, providing virtual physical therapy work, providing virtual medical clinical work or appointments, providing virtual massage, and/or providing any other suitable type of computing device interaction involving tactile contact or stimulation of a body portion In at least some exemplary embodiments, game setting module 340 may set a game type (e.g., a desired video game or virtual game) as described for example herein that may serve as the computing device interaction. Game instruction module 345 may allow a user to set attributes for control of a given game via accessory 330 and/or accessory 331 as described for example herein. Game result module 350 may evaluate game performance by one or more users and/or an artificial intelligence "game-player" as described for example herein. Game communication module 355 may provide for one or more users to control one or more accessories 330 and/or 331 based on a determination of game result module 350, predetermined criteria, user input, and/or any other suitable criteria as described for example herein.

The components of system 300 may be directly connected (e.g., by wire, cable, USB connection, and/or any other suitable electro-mechanical connection) to each other and/or connected via a network (e.g., via Ethernet LAN) that may be similar to the exemplary network disclosed below regarding FIG. 23. System 300 may also include communication components that may be any suitable devices for communicating data between the various components of system 300 either directly or via network communication.

For example, system 300 may include any suitable transceiver devices (e.g., transmitter device and/or receiver device) for transmitting data between components of system 300 and also for receiving data from other components of system 300. System 300 may also include a plurality of computing devices, a plurality of exemplary user interfaces, and/or a plurality of any other components of system 300 that may be in direct communication and/or connected via network. For example, components of system 300 may receive and transmit data as disclosed below regarding exemplary communication techniques of FIG. 23. For example, components of system 300 may wirelessly transmit data by any suitable technique such as, e.g., wirelessly transmitting data via 4G LTE networks (e.g., or any other suitable data transmission technique for example via network communication). Also for example, components of system 300 may transmit data via cable.

Figure 2:
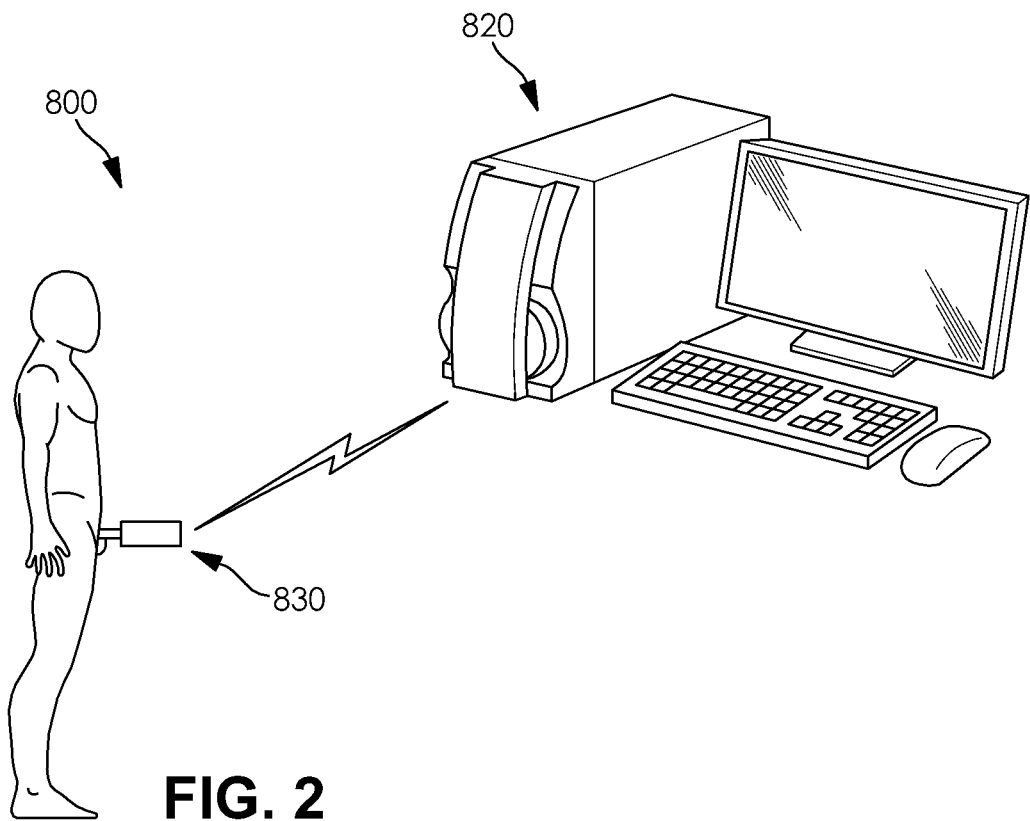
FIG. 2 is a schematic illustration of an exemplary system of the present invention.

FIG. 2 illustrates an exemplary embodiment of the exemplary disclosed system. System 800 may include an accessory 830 that may be similar to accessory 330 and that may be worn by a user (e.g., user 324 and/or model 335). Accessory 830 may communicate with a user device 820 that may be similar to user device 322. In at least some exemplary embodiments, accessory 830 may be wirelessly connected to user device 820.

System 800 may be a single player mode in which a player (e.g., user 324 or model 335) may play a game with a role in the game controlled by Artificial Intelligence as described for example herein. Accessory 830 may be a male adult toy (e.g., a penis sleeve) or a female adult toy (e.g., a dildo or a vibrator). System 800 may be used in a game (e.g., a video game or a virtual game) having two or more roles. One role may be played by a player (e.g., user 324 or model 335) and one role may be controlled by artificial intelligence (e.g., a virtual role played by a computer or neural network of system 800). Accessory 830 that may be an adult toy may be actuated based on an operation of system 800. For example if the game role controlled by the player (e.g., user 324 or model 335) is beaten in the game by the Artificial Intelligence role, system 800 may control accessory 830 to vibrate (e.g., or take any other exemplary action as described for example herein), e.g., within a certain period of time. If the game role controlled by the player (e.g., user 324 or model 335) is dead or reaches exhaustion (e.g., runs out of energy) in the game, system 800 may control accessory 830 to vibrate from a strong vibration to a weak vibration until stopping (e.g., or take any other action as described for example herein).

There may be multiple game roles controlled by the exemplary Artificial Intelligence, including varying levels of Artificial Intelligence performance with varying levels of difficulty to be able to defeat during game play. A given player (e.g., user 324 or model 335) may select an Artificial Intelligence level that is suitable for that player. For example, a beginner-level player may choose a low-level Artificial Intelligence role as an opponent, and an experienced player may choose a more advanced level (e.g., tougher or harder to defeat) Artificial Intelligence role as an opponent to make the game more challenging.

The exemplary disclosed accessory may generate control instructions when used in the exemplary system by detecting a user's movement on the adult toy. For example, the deeper that a player's body portion is inserted into the exemplary accessory that may be an adult toy (e.g., the deeper a penis is inserted into a penis sleeve), the stronger a command that is given to control the user's game role may be. For example, a game role (e.g., avatar or other suitable character displayed in a game) may be caused to act with greater power (e.g., jump further, move faster, generate more energy, shoot stronger lasers, and/or any other game play actions that may be made stronger). Similar instructions having a greater power may be relayed for example when the exemplary accessory is a vibrator or a dildo (e.g., or other suitable sex toy) that is inserted deeply into a user's body part (e.g., genital body part such as a vagina) or any other desired body cavity.

Figure 3:
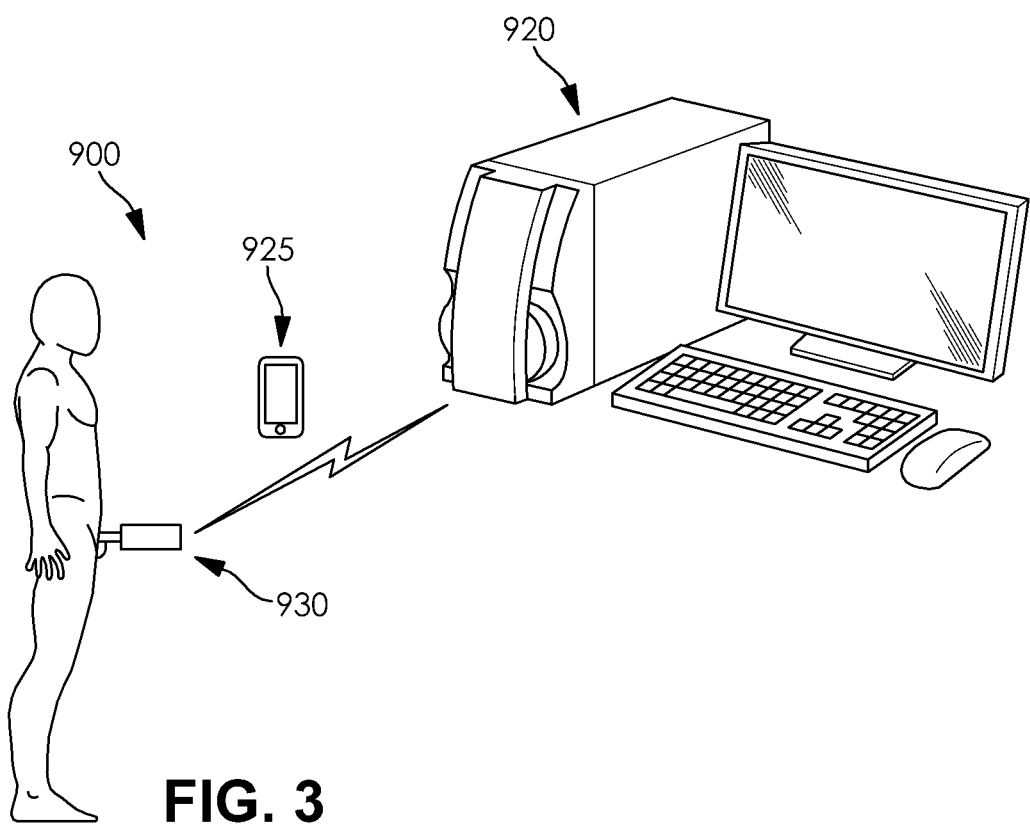
FIG. 3 is a schematic illustration of an exemplary system of the present invention.

FIG. 3 illustrates another exemplary embodiment of the exemplary disclosed system. System 900 may include an accessory 930 that may be similar to accessory 330 and that may be worn by a user (e.g., user 324 and/or model 335). Accessory 930 may communicate with a user device 920 that may be similar to user device 322 and/or a personal device 925 that may be similar to personal device 325. In at least some exemplary embodiments, accessory 930 may be wirelessly connected to user device 920 and/or personal device 925.

System 900 may be a single player mode in which a player (e.g., user 324 or model 335) may play a game using both personal device 925 (e.g., a cell phone or a smartphone) and user device 920. Accessory 930 may be an adult toy that may communicate with user device 920 that may be a computer and personal device 925 that may be a cell phone or smartphone. Accessory 930 may be controlled via user device 920 and/or personal device 925. Also for example, personal device 925 may serve as a signal transmitter between accessory 930 and user device 920. In at least some exemplary embodiments, accessory 930 may connect to personal device 925 via Bluetooth, and personal device 925 may connect via WIFI to a local area network to which user device 920 is connected (e.g., is located on or is a part of).

Figure 4:
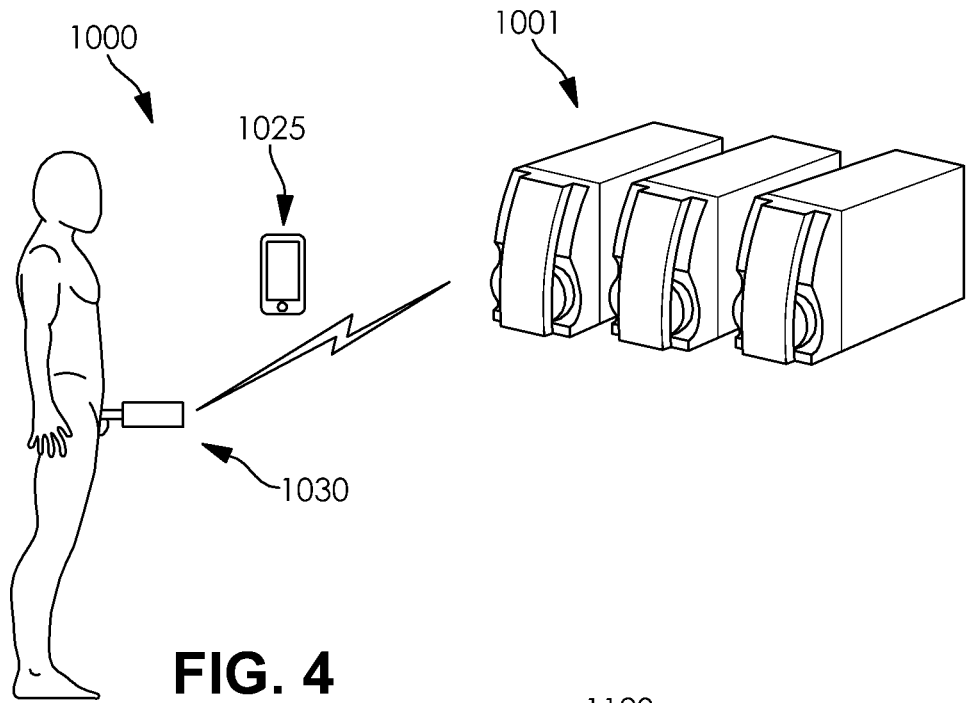
FIG. 4 is a schematic illustration of an exemplary system of the present invention.

FIG. 4 illustrates another exemplary embodiment of the exemplary disclosed system. System 1000 may include an accessory 1030 that may be similar to accessory 330 and that may be worn by a user (e.g., user 324 and/or model 335). Accessory 1030 may communicate with a WAN 1001 that may be similar to the exemplary WAN described herein and/or a personal device 1025 that may be similar to personal device 325. In at least some exemplary embodiments, accessory 930 may be wirelessly connected to WAN 1001 and/or personal device 1025.

System 1000 may be an online playing mode in which a player (e.g., user 324 or model 335) may play an online game using WAN 1001. In at least some exemplary embodiments, personal device 1025 may be a cell phone or a smartphone that may connect to WAN 1001 that may be a cloud server. For example, each player (e.g., one or more users 324 and/or models 335) may use personal device 1025 to play games without desktop or laptop computers. In at least some exemplary embodiments, games may be downloaded from WAN 1001 and installed on personal device 1025, and then the player (e.g., user 324 or model 335) can play the game using accessory 1030 and personal device 1025 in the absence of a network (e.g., WAN 1001).

Figure 5:
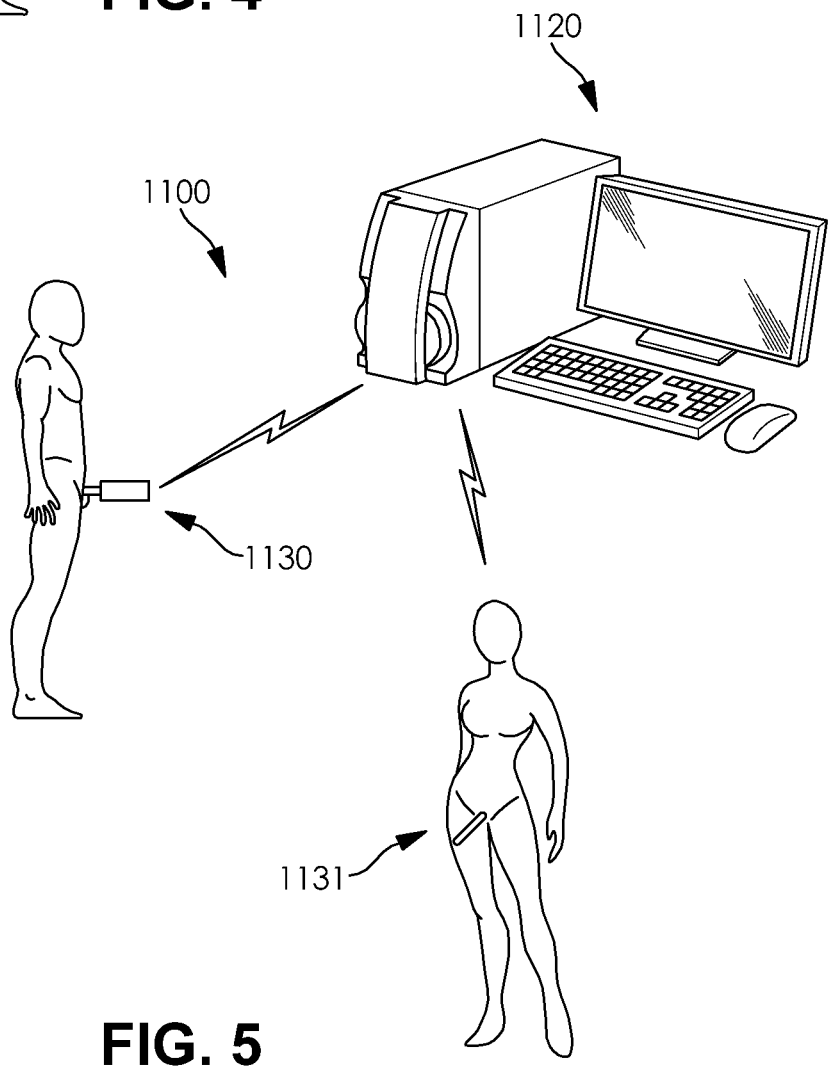
FIG. 5 is a schematic illustration of an exemplary system of the present invention.

FIG. 5 illustrates another exemplary embodiment of the exemplary disclosed system. System 1100 may include an accessory 1130 that may be similar to accessory 330 and that may be worn by a user (e.g., user 324). Accessory 1130 may communicate with a user device 1120 that may be similar to user device 322. System 1100 may also include an accessory 1131 that may be similar to accessory 331 and that may be worn by a user (e.g., model 335). Accessory 1131 may communicate with user device 1120. In at least some exemplary embodiments, accessories 1130 and/or 1131 may be wirelessly connected to user device 1120.

System 1100 may be a multiple player mode (e.g., double player mode) in which multiple players (e.g., one or more users 324 and/or one or more models 335) may be located together (e.g., in the same room, building, or located near each other). In the exemplary multiple player mode, two or more players (e.g., one or more users 324 and/or one or more models 335) in the same or nearby location can play a game using user device 1120. Each of the players may have an exemplary accessory (e.g., accessories 1130 or 1131) that may be an adult toy. In a preparation stage of the exemplary game, the exemplary accessories (e.g., accessories 1130 or 1131) that may be adult toys may be connected to user device 1120, and each player (e.g., one or more users 324 and/or one or more models 335) may choose a role using user device 1120, with each chosen role being controlled by the accessory worn or held by the respective player who chose the role in the game. The exemplary accessories (e.g., accessories 1130 or 1131) may be for example male or female adult toys. In at least some exemplary embodiments, there may be two or more roles in the game, with the roles being controlled by a real person who is the player (e.g., one or more users 324 and/or one or more models 335). The exemplary accessories may be actuated or moved as described above regarding system 800. For example, if one role (e.g., game character) is beaten by another role (e.g., game character) and/or for example wounded, the exemplary accessory (e.g., accessories 1130 or 1131) may vibrate or make any other suitable action as described herein within a certain period of time. Also similarly to as described above regarding system 800, if one role is dead or becomes exhausted, the exemplary accessory may vibrate (e.g., or take any other exemplary action as described herein) from a strong to weak vibration until stopping. When the game is over, a winner (e.g., user 324 or model 335) may be able to control the loser's accessory (e.g., accessory 1130 or 1131) via his or her own accessory. Similar to as described above, a role (e.g., game character) may be made to move more strongly based on a user pushing a body part deeper into an exemplary accessory and/or inserting the exemplary accessory deeper into the user's body cavity. Players (e.g., one or more users 324 and/or one or more models 335) may control multiple roles (e.g., game characters) in the game and may utilize varying weapons or tools in the game depending on the selected characters. Players may choose one or more suitable roles for themselves.

Figure 6:
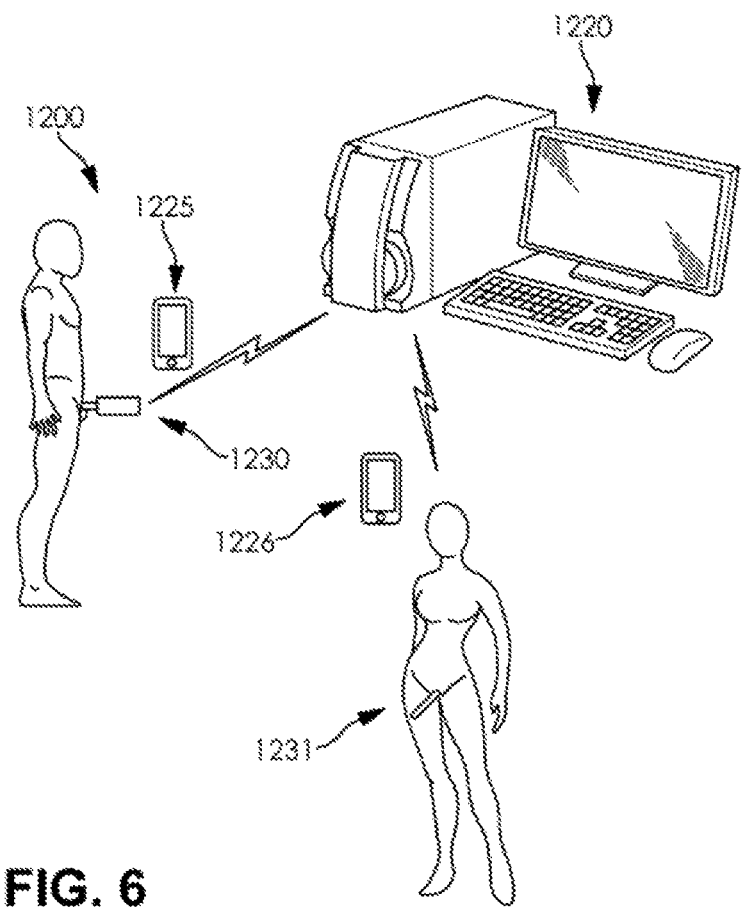
FIG. 6 is a schematic illustration of an exemplary system of the present invention.

FIG. 6 illustrates another exemplary embodiment of the exemplary disclosed system. System 1200 may include an accessory 1230 that may be similar to accessory 330 and that may be worn by a user (e.g., user 324 and/or model 335). Accessory 1230 may communicate with a user device 1220 that may be similar to user device 322 and/or a personal device 1225 that may be similar to personal device 325. System 1200 may also include an accessory 1231 that may be similar to accessory 331 and that may be worn by a user (e.g., user 324 and/or model 335). Accessory 1231 may communicate with user device 1220 and/or a personal device 1226 that may be similar to personal device 326. In at least some exemplary embodiments, accessories 1230 and 1231 may be wirelessly connected to user device 1220 and/or personal devices 1225 and 1226.

In at least some exemplary embodiments, accessories 1230 and/or 1231 that may be adult toys may communicate (e.g., connect to) user device 1220 and personal devices 1225 and/or 1226. System 1200 and/or users may control or actuate accessories 1230 and/or 1231 via user device 1220 and/or personal devices 1225 and/or 1226. Personal devices 1225 and/or 1226 may also serve as signal transmitters between accessories 1230 and/or 1231 and user device 1220. For example, accessories 1230 and/or 1231 may connect to personal devices 1225 and/or 1226 via Bluetooth, and personal devices 1225 and/or 1226 may connect via WIFI to an exemplary WAN or local area network on which user device 1220 is located.

Figure 7:
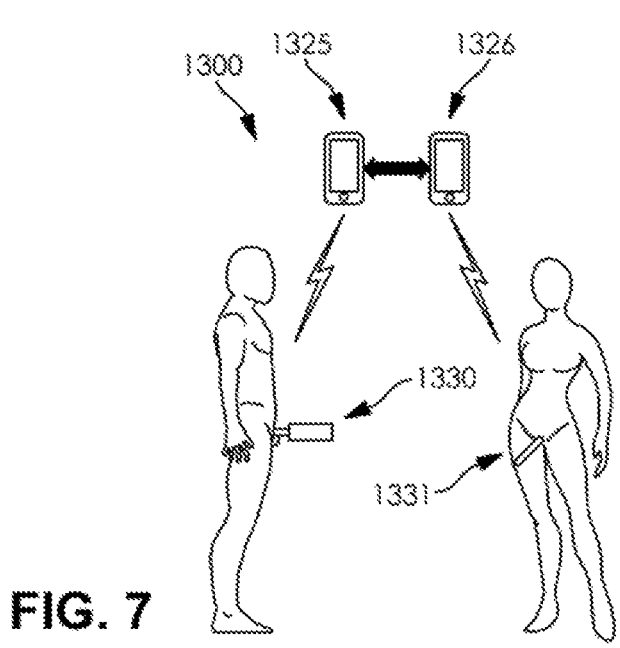
FIG. 7 is a schematic illustration of an exemplary system of the present invention.

FIG. 7 illustrates another exemplary embodiment of the exemplary disclosed system. System 1300 may include an accessory 1330 that may be similar to accessory 330 and that may be worn by a user (e.g., user 324). Accessory 1330 may communicate with a personal device 1325 that may be similar to personal device 325. System 1300 may also include an accessory 1331 that may be similar to accessory 331 and that may be worn by a user (e.g., model 335). Accessory 1331 may communicate with a personal device 1326 that may be similar to personal device 326.

In at least some exemplary embodiments, personal devices 1325 and 1326 may be connected to an exemplary WAN (e.g., cloud server), and players (e.g., user 324 and model 335) may use respective personal devices 1325 and 1326 to play games (e.g., video games) without desktop or laptop computers. In at least some exemplary embodiments, games may be downloaded from the exemplary WAN and installed on personal devices 1325 and 1326, and then the players (e.g., one or more users 324 and/or one or more models 335) may play the game using respective accessories 1330 and 1331 and personal devices 1325 and 1326 in the absence of a network (e.g., WAN 1001). Personal devices 1325 and 1326 may be for example matched (e.g., communicate with each) so that game action of a shared game may be shown in both devices. Personal devices 1325 and 1326 may be for example matched cellphones or smartphones.

Figure 8:
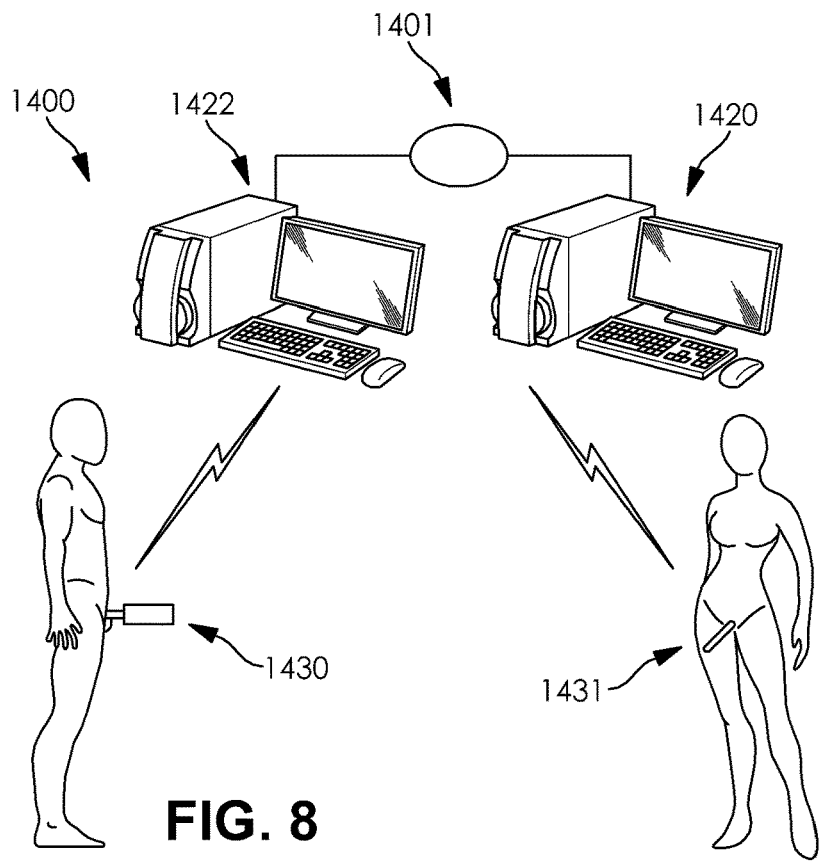
FIG. 8 is a schematic illustration of an exemplary system of the present invention.

FIG. 8 illustrates another exemplary embodiment of the exemplary disclosed system. System 1400 may include an accessory 1430 that may be similar to accessory 330 and that may be worn by a user (e.g., user 324). Accessory 1430 may communicate with a user device 1422 that may be similar to user device 322. User device 1422 may communicate with a WAN 1401. System 1400 may also include an accessory 1431 that may be similar to accessory 331 and that may be worn by a user (e.g., model 335). Accessory 1431 may communicate with user device 1420. User device 1420 may communicate with WAN 1401. In at least some exemplary embodiments, accessories 1430 and/or 1431 may be wirelessly connected to respective user devices 1422 and/or 1420. User devices 1420 and 1422 may communicate via WAN 1401. System 1400 may facilitate a computing device interaction when players (e.g., one or more users 324 and/or one or more models 335) are located in different geographic areas.

Figure 9:
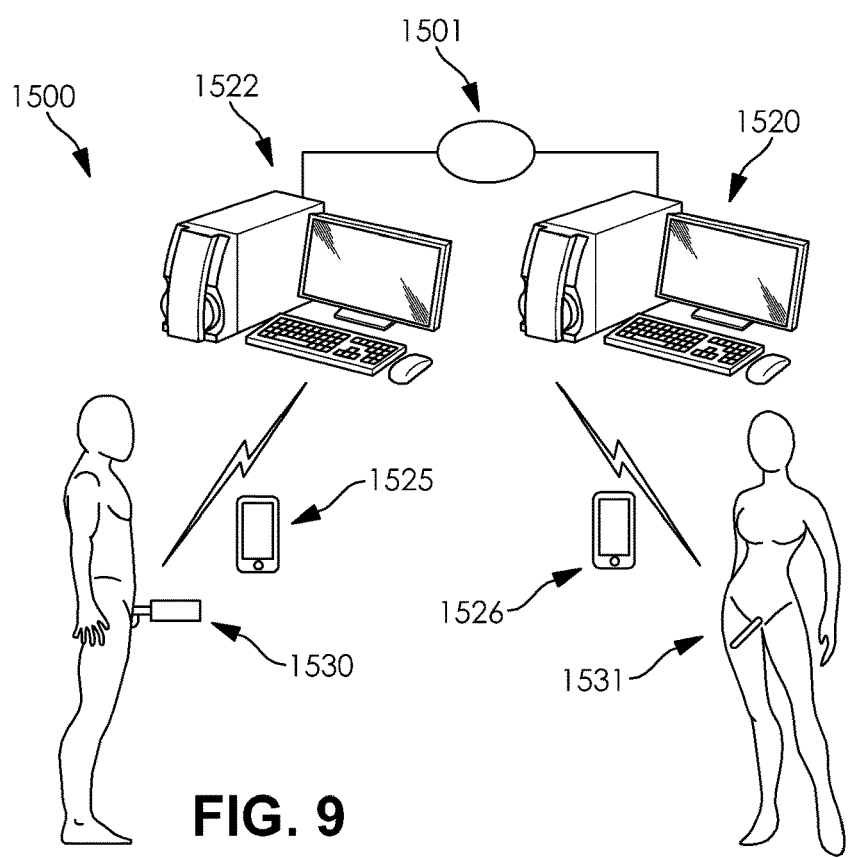
FIG. 9 is a schematic illustration of an exemplary system of the present invention.

FIG. 9 illustrates another exemplary embodiment of the exemplary disclosed system. System 1500 may include an accessory 1530 that may be similar to accessory 330 and that may be worn by a user (e.g., user 324). Accessory 1530 may communicate with a user device 1522 that may be similar to user device 322 and/or a personal device 1525 that may be similar to personal device 325. User device 1522 may communicate with a WAN 1501. System 1500 may also include an accessory 1531 that may be similar to accessory 331 and that may be worn by a user (e.g., model 335). Accessory 1531 may communicate with a user device 1520 that may be similar to model device 320 and/or a personal device 1526 that may be similar to personal device 326. User device 1520 may communicate with WAN 1501. In at least some exemplary embodiments, accessories 1530 and 1531 may be wirelessly connected to respective user devices 1520 and/or 1522 and/or personal devices 1525 and 1526. User devices 1520 and 1522 may communicate via WAN 1501. System 1500 may facilitate a computing device interaction when players (e.g., one or more users 324 and/or one or more models 335) are located in different geographic areas.

Figure 10:
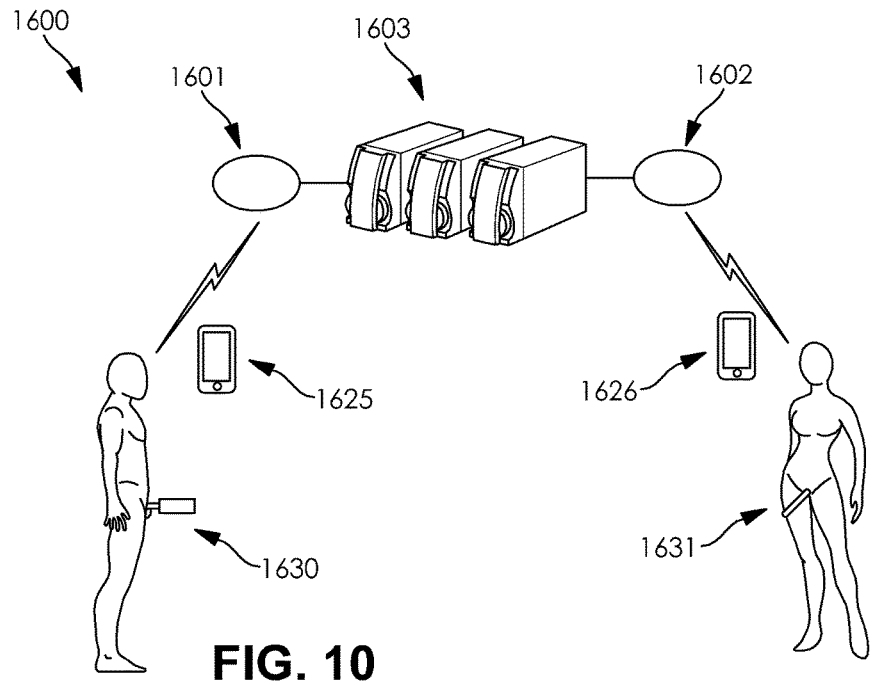
FIG. 10 is a schematic illustration of an exemplary system of the present invention.

FIG. 10 illustrates another exemplary embodiment of the exemplary disclosed system. System 1600 may include an accessory 1630 that may be similar to accessory 330 and that may be worn by a user (e.g., user 324). Accessory 1630 may communicate with a personal device 1625 that may be similar to personal device 325. System 1600 may also include an accessory 1631 that may be similar to accessory 331 and that may be worn by a user (e.g., model 335). Accessory 1631 may communicate with a personal device 1626 that may be similar to personal device 326. Personal device 1625 may communicate with a network 1601 and personal device 1626 may communicate with a network 1602. Networks 1601 and 1602 may be a WAN, LAN, or any other suitable type of network. Networks 1601 and 1602 may communicate with a cloud server 1603. It is also contemplated that networks 1601 and 1602 and cloud server 1603 may be integral parts of a single WAN. System 1600 may thereby facilitate online game play.

In at least some exemplary embodiments, both online and offline games may be played using system 1600. For example, offline games can be played in the absence of networks 1601 and 1602. Online games may be played via personal devices 1625 and 1626 that may be cellphones or smartphones that communicate with cloud server 1603. When personal devices 1625 and 1626 connect to cloud server 1603, players may use personal devices 1625 and 1626 to play games without desktop or laptop computers.

Figure 11:
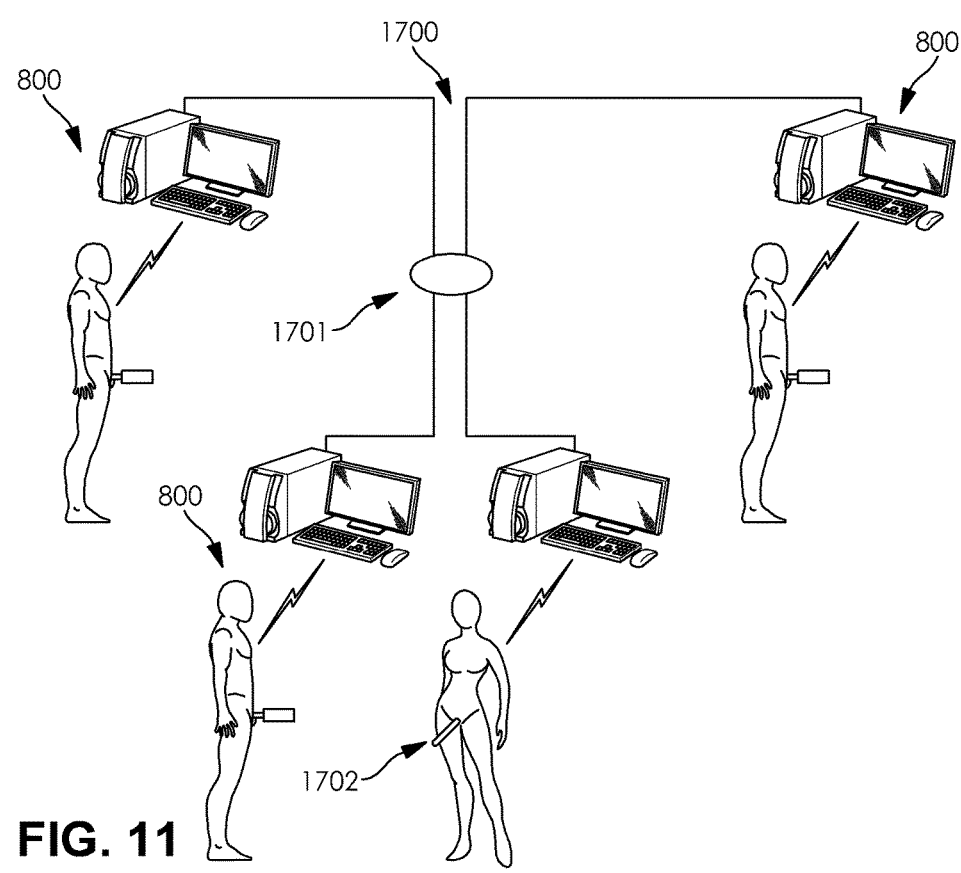
FIG. 11 is a schematic illustration of an exemplary system of the present invention.

FIG. 11 illustrates another exemplary embodiment of the exemplary disclosed system. System 1700 may include a plurality of systems 800 that may be in communication with a broadcast platform 1701. Broadcast platform 1701 may include any suitable components of server subsystem 315 and/or the exemplary disclosed WAN described herein. System 1700 may also include one or more systems 1702 that may be in communication with broadcast platform 1701 and that may be similar to system 800. In at least some exemplary embodiments, user 324 may utilize system 800 and model 335 may utilize system 1702.

In at least some exemplary embodiments, games may be played by more than two players using system 1700. The players may be divided into models 335 (e.g., system 1702) and customers (e.g., users 324 using systems 800). One or more models 335 and one or more users 324 may meet and communicate in a chat room provided by broadcast platform 1701. Customers (e.g., users 324) may send "tips" (e.g., transfer value using system 1700 such as currency and cryptocurrency) to the model (e.g., model 335), and the model (e.g., model 335) may define some of the game parameters based on a certain amount of tips. If a customer (e.g., user 324) wants to play a game with the model (e.g., model 335), the customer may send a certain amount of tips (e.g., value such as currency) to the model, and the model (e.g., model 335) may then send a control link to the customer via system 1700. For example, the exemplary control link may set up a connection among the model's accessory that may be an adult toy, the customer's accessory that may be an adult toy, and the game being provided to the model and customers via system 1700.

In at least some exemplary embodiments, if a role (e.g., game character) controlled by a customer (e.g., user 324) is beaten by the role (e.g., game character) controlled by the model and "wounded" or loses energy or credits, the customer's adult toy (e.g., accessory 330 or 331) may vibrate within a certain period of time, and may weaken or stop as described for example above. Users may control each other's accessories as described for example above. In at least some exemplary embodiments, if a customer (e.g., user 324) wins a game, the customer may control the model's accessory (e.g., may make an adult toy vibrate or make any other desired action as described for example herein). The game between the model (e.g., model 335) and the customer (e.g., user 324) may be broadcast live in the chat room, and other customers (e.g., users 324) who have not joined the game may watch the game via respective systems 800.

Figure 12:
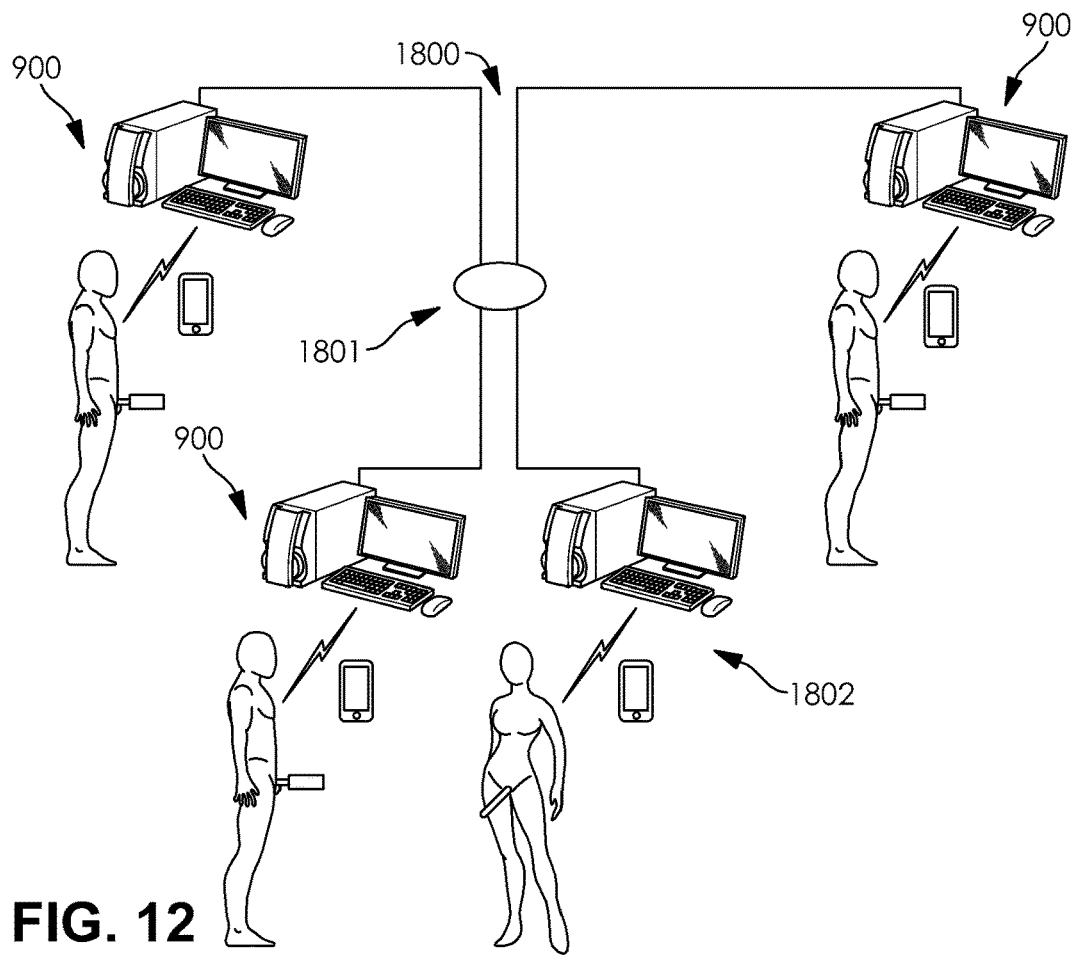
FIG. 12 is a schematic illustration of an exemplary system of the present invention.

FIG. 12 illustrates another exemplary embodiment of the exemplary disclosed system. System 1800 may include a plurality of systems 900 that may be in communication with a broadcast platform 1801. Broadcast platform 1801 may include any suitable components of server subsystem 315 and/or the exemplary disclosed WAN described herein. System 1800 may also include one or more systems 1802 that may be in communication with broadcast platform 1801 and that may be similar to system 900. In at least some exemplary embodiments, user 324 may utilize system 900 and model 335 may utilize system 1802.

In at least some exemplary embodiments, both the model (e.g., model 335) and the customers (e.g., users 324) may use cellphones or smartphones to connect their accessories (e.g., adult toys) via system 1800, and their accessories may be acted on by both computing devices and cellphones or smartphones. Cellphones or smartphones may also serve as signal transmitters between the adult toys and the computers as described for example above. For example, adult toys may connect to cellphones or smartphones via Bluetooth, and cellphones may be connected via WIFI to broadcast platform 1801.

Figure 13:
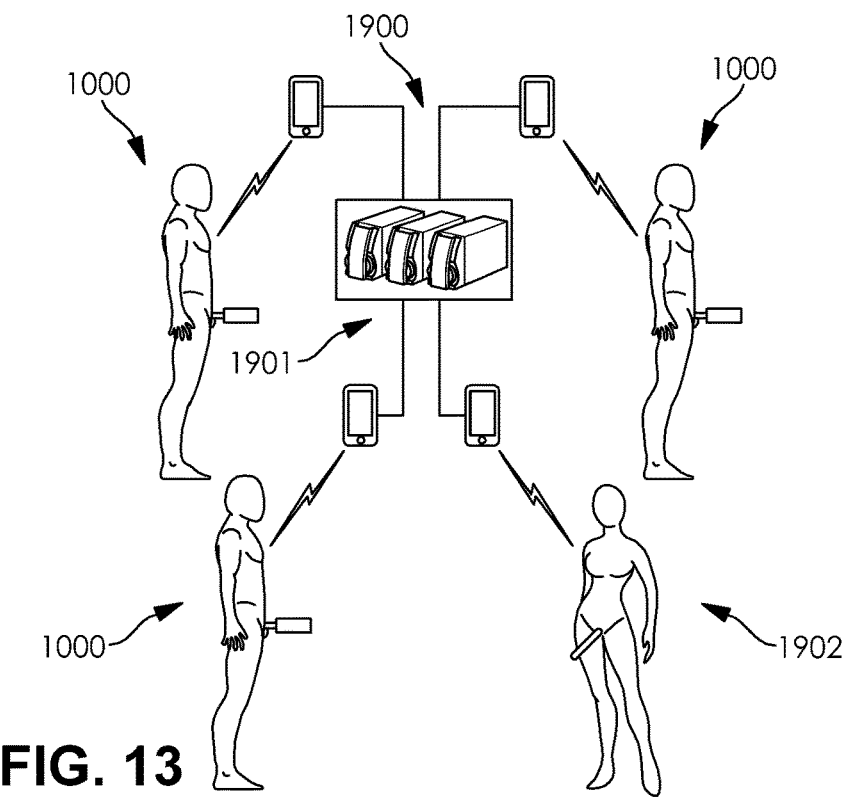
FIG. 13 is a schematic illustration of an exemplary system of the present invention.

FIG. 13 illustrates another exemplary embodiment of the exemplary disclosed system. System 1900 may include a plurality of systems 1000 that may be in communication with a broadcast platform 1901. Broadcast platform 1901 may include any suitable components of server subsystem 315 and/or the exemplary disclosed WAN described herein. For example, broadcast platform 1901 may be a cloud server with broadcast platform. System 1900 may also include one or more systems 1902 that may be in communication with broadcast platform 1901 and that may be similar to system 1000. In at least some exemplary embodiments, user 324 may utilize system 1000 and model 335 may utilize system 1902. In at least some exemplary embodiments, system 1900 may provide game play using a broadcast platform without the use of desktop or laptop computers.

Figure 14:
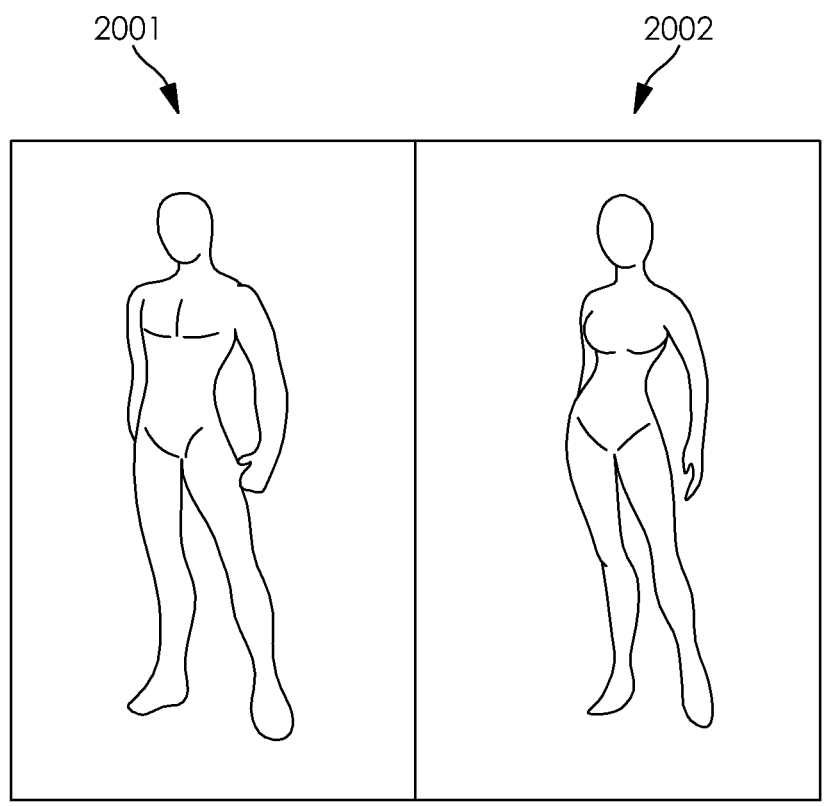
FIG. 14 is a schematic illustration of an exemplary system of the present invention.

FIG. 14 illustrates exemplary roles that may be used in one or more games of the exemplary disclosed system. For example, the exemplary disclosed system may include a first role (e.g., role "A") that may be a game character 2001 (e.g., a male character or any other desired character as described for example herein). Also for example, the exemplary disclosed system may include a second role (e.g., role "B") that may be a game character 2002 (e.g., a female character or any other desired character as described for example herein). Game characters 2001 and 2002 may be any desired graphical element that may be displayed by the exemplary disclosed system (e.g., a cartoon character, a graphical depiction of the user, and/or any other suitable graphical depiction that may be displayed on a display of a computing device as described for example herein).

FIGS. 15A through 15E illustrate exemplary control movements that a user (e.g., user 324 or model 335) may make utilizing an exemplary disclosed accessory (e.g., accessory 330 or accessory 331). The exemplary disclosed system may provide any desired game, and users may select a desired game from an exemplary disclosed user interface. For example, users may play a fighting game using virtual game characters (e.g., game characters 2001 and 2002), which may be controlled using the exemplary disclosed accessories (e.g., accessories 330 and/or 331). In a first example, game character 2001 may be controlled by a user using an accessory and game character 2002 may be controlled by the exemplary system (e.g., by artificial intelligence). In a second example, game character 2001 may be controlled by a user using an accessory and game character 2002 may be controlled by another user using an accessory. In a third example, game character 2001 may be controlled by the exemplary system (e.g., by artificial intelligence) and game character 2002 may be controlled by a user using an accessory. In a fourth example, both game characters 2001 and 2002 may be controlled by the exemplary system (e.g., by artificial intelligence).

Figures 15A, 15B, 15C, 15D, 15E:
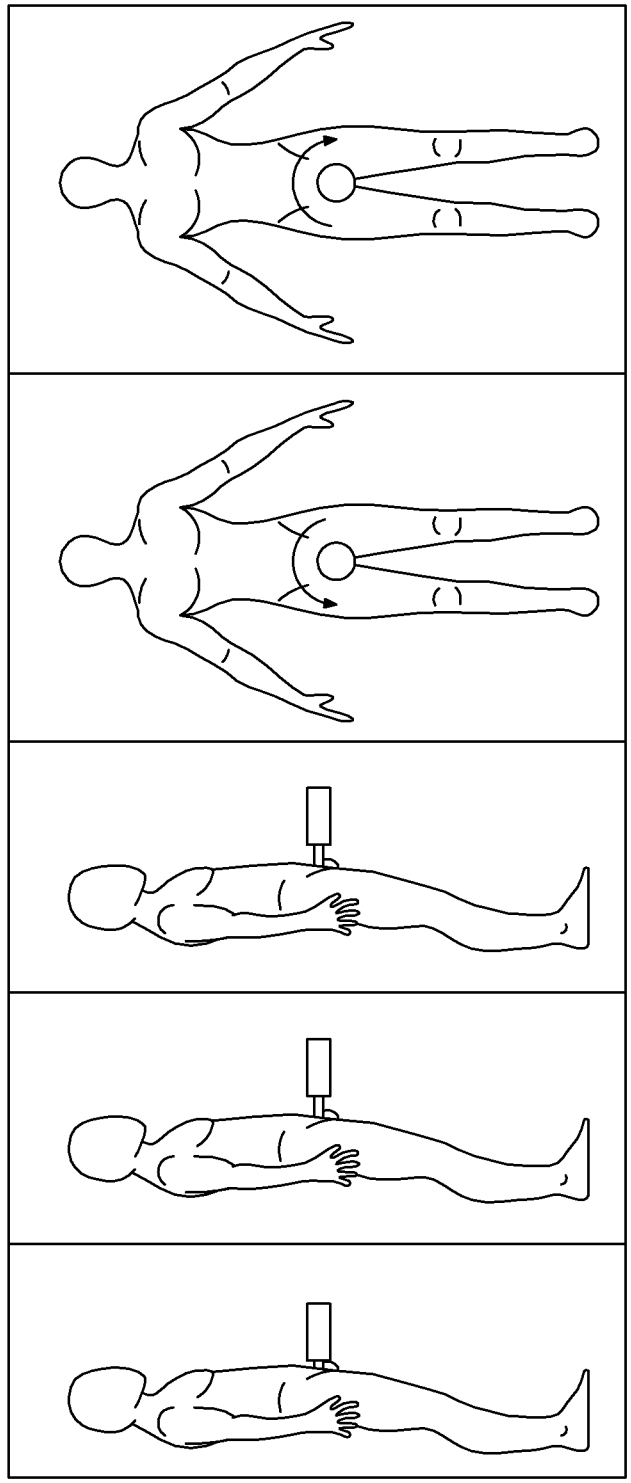
FIG. 15A is a schematic illustration of an exemplary system of the present invention.
FIG. 15B is a schematic illustration of an exemplary system of the present invention.
FIG. 15C is a schematic illustration of an exemplary system of the present invention.
FIG. 15D is a schematic illustration of an exemplary system of the present invention.
FIG. 15E is a schematic illustration of an exemplary system of the present invention.

In at least some exemplary embodiments, if a game character is controlled by an adult toy, predetermined (e.g., pre-defined) instructions maybe stored by the exemplary disclosed system. The instructions may be for example predetermined instructions or customized instructions input by a user. Each predetermined instruction may be related to a certain operation of the adult toy. An exemplary instruction may be a backward instruction (e.g., as illustrated in FIG. 15A): part of the user's (e.g., user 324) body may come out slowly from the accessory (e.g., accessory 330 that may be an adult toy), and a sensor system of the accessory may then detect the operation and send control data to the exemplary system to trigger an instruction that may make the character (e.g., game character 2001 or 2002) move back in the game. Another exemplary instruction may be a forward instruction (e.g., as illustrated in FIG. 15B): part of the user's (e.g., user 324) body may go into the accessory (e.g., adult toy), and a sensor system may then detect the operation and send control data to the exemplary system to trigger an instruction that makes the game character (e.g., game character 2001 or 2002) move ahead in the game. Another exemplary instruction may be a press instruction (e.g., as illustrated in FIG. 15C): there may be buttons on the accessory (e.g., adult toy), and when those buttons are pressed, the adult toy may send control data to the exemplary system to trigger instructions that may for example make the character begin to fight or throw a bomb to kill another game character (e.g., game character 2001 or 2002). Another exemplary instruction may be a clockwise rotation instruction (e.g., as illustrated in FIG. 15D): when the accessory (e.g., adult toy) rotates in a clockwise direction, the sensor system may then detect the operation and send a control data to the exemplary system to trigger an instruction that may make the game character (e.g., game character 2001 or 2002) turn or rotate in a first direction. Another exemplary instruction may be a counterclockwise rotation instruction (e.g., as illustrated in FIG. 15E): when the accessory (e.g., adult toy) rotates in a counterclockwise direction, the sensor system may then detect the operation and send a control data to the exemplary system to trigger an instruction that may make the character (e.g., game character 2001 or 2002) turn or rotate in a second direction that may be opposite to the first direction illustrated in FIG. 15D.

In at least some exemplary embodiments, the game characters (e.g., game character 2001 or 2002) may be controlled by exemplary accessories (e.g., accessories 330 and 331 such as adult toys), and the exemplary accessories may also be controlled by actions of the game characters. For example in the case of a fighting game, if a game character (e.g., game character 2001 or 2002) defeats his or her opponent and wins the game, the game character may earn credit (e.g., "energy") to actuate (e.g., control the exemplary accessory as described for example above) the exemplary accessory (e.g., accessories 330 and/or 331 such as an adult toy). If a game character (e.g., game character 2001 or 2002) is defeated by his or her opponent, then that character may die in the game, and the accessory (e.g., accessory 330 or accessory 331) worn by the user controlling that game character may vibrate for a predetermined time (e.g., a spawning time that may be a time for introducing a new character controlled by that user into the game) with for example a countdown.

In at least some exemplary embodiments when the game is played on a broadcast platform for example as illustrated in FIGS. 11-13, a winner (e.g., user 324 or model 335) of the game may be granted access to an operation (e.g., a privilege) by system 300 to activate exemplary accessories of other users. For example, the winner may cause (e.g., trigger) exemplary accessories (e.g., accessories 330 or 331) of other users (e.g., one or more users 324 and/or one or more models 335) to vibrate or make any other exemplary action as described for example herein. The game may be displayed by system 300 on an exemplary user device (e.g., a display or "broadcast show window" displayed by model device 320, user device 322, personal device 325, and/or personal device 326), and a user (e.g., a human user such as user 324 or model 335 who has logged into the broadcast platform) may control the virtual game character (e.g., game character 2001 or 2002) directly or via operation of an exemplary accessory (e.g., accessory 330 or accessory 331) as described for example herein. A given virtual game character (e.g., game character 2001 or 2002) maybe related to a given user (e.g., an account of a given user 324 or model 335 active on system 300), and that user may add credits (e.g., purchase credits or value for use on system 300 via paying currency or "tips") to obtain additional energy for one or more virtual game characters (e.g., one or more game characters 2001 and/or 2002) controlled by that user.

Figure 16:
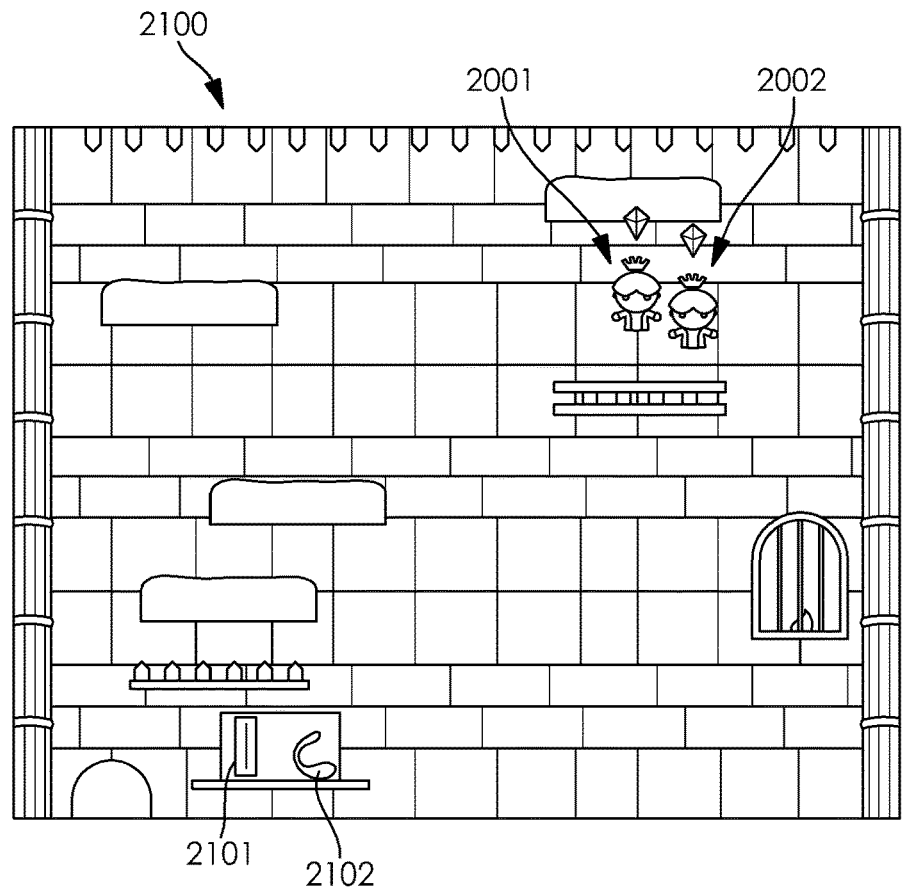
FIG. 16 is a schematic illustration of an exemplary system of the present invention.

FIG. 16 illustrates another exemplary embodiment of the exemplary disclosed system. System 2100 may include any suitable game and video game interface such as a "passing through" game. For example, users (e.g., user 324) may select a desired game from various game options provided by system 2100. For example, a user (e.g., user 324) may control game character 2001 and a model (e.g., model 335) may control game character 2002 using exemplary accessories (e.g., accessory 330 or accessory 331) as described for example above. In at least some exemplary embodiments, graphical objectives (e.g., graphical element 2101 and graphical element 2102) may be displayed, which the users may compete with each other to reach first. For example, graphical elements 2101 and 2102 may graphically display adult toys that may be worn by the various users controlling the characters. For example, when one user (e.g., user 324 or model 335) reaches a graphical element 2101 or 2102 or completes a certain level of the game first, that user may be granted a privilege by system 2100 to control (e.g., trigger) an exemplary accessory (e.g., accessory 330 or accessory 331) of the other users in the game to vibrate or be actuated in any suitable way (e.g., as described for example above).

Figure 17:
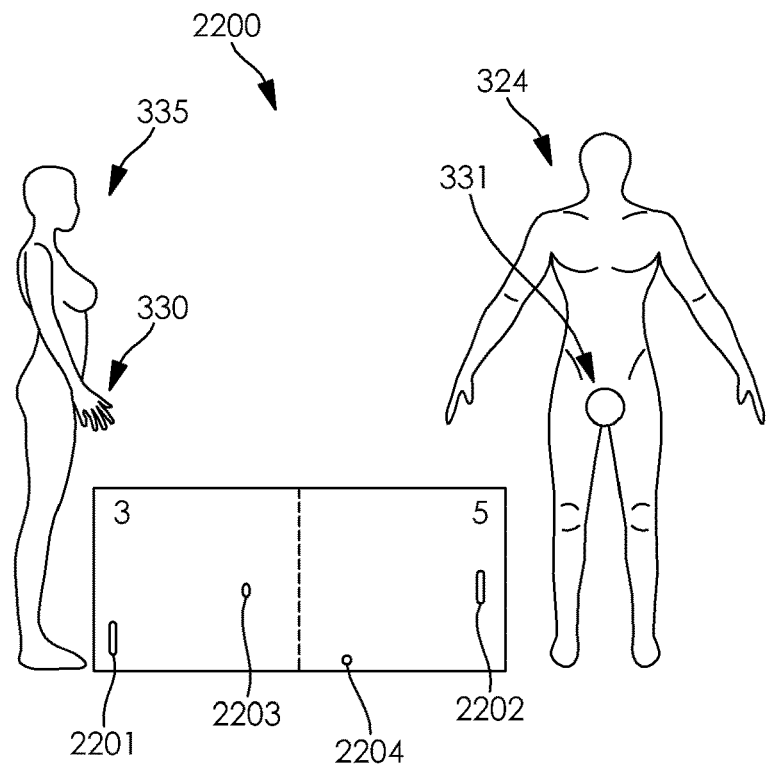
FIG. 17 is a schematic illustration of an exemplary system of the present invention.

FIG. 17 illustrates another exemplary embodiment of the exemplary disclosed system. System 2200 may include any suitable game and video game interface such as a sports game (e.g., ping pong, tennis, basketball, soccer, football, and/or any other suitable sports game for video game play). For example, a user (e.g., model 335) may control graphical element 2201 using an exemplary accessory (e.g., accessory 330) as described for example above. Another user (e.g., user 324) may control graphical element 2202 using an exemplary accessory (e.g., accessory 331) as described for example above. As illustrated in FIG. 17, graphical elements 2201 and 2202 may be baffles for blocking one or more "game balls" such as graphical elements 2203 and 2204 at both ends of a "game table." Users (e.g., user 324 and model 335) may control respective graphical elements 2201 and 2202 (e.g., baffles) to move up and down via control of respective accessories (e.g., accessories 330 and 331). Also for example, a speed of movement of graphical elements 2201, 2202, 2203, and/or 2204 may be controlled via control by the users of respective accessories 330 and 331. For example, the deeper a body part (e.g., a penis) of user 324 may be inserted into accessory 331 (e.g., a penis sleeve), the faster a speed of graphical elements 2201, 2202, 2203, and/or 2204 (e.g., one or more baffles and/or one or more game balls) may be. Also for example, the deeper accessory 330 (e.g., a dildo) may be inserted into a body part (e.g., a vagina) of model 335, the faster a speed of graphical elements 2201, 2202, 2203, and/or 2204 (e.g., one or more baffles and/or one or more game balls) may be.

Graphical elements 2203 and/or 2204 (e.g., game balls) may bounce back and forth between ends of the game playing space (e.g., between ends of the "game table"). If graphical elements 2203 and/or 2204 are blocked by graphical elements 2201 and/or 2202 (e.g., a baffle), the game ball may bounce back toward the other side of the playing space. If graphical elements 2203 and/or 2204 (e.g., one or more balls) are not blocked and continue past the end of the "game table," the balls may come off of the game table and drop to the "floor," with the user who missed blocking the ball for example losing a point and/or losing the game. When the game has ended, the exemplary accessory (e.g., accessory 330 or 331, which may be an adult toy) of the losing player (e.g., user 324 or model 335) may vibrate from a strong level to a weak level (e.g., or make any other actions or movements as described for example herein) until stopping, and the exemplary accessory (e.g., accessory 330 or 331, which may be an adult toy) of the winning player (e.g., user 324 or model 335) may vibrate from a weak level to a strong level (e.g., or make any other actions or movements as described for example herein) for a predetermined period of time (e.g., a time that may be set by system 2200).

In a first example, graphical element 2201 may be controlled by a user using an accessory and graphical element 2202 may be controlled by the exemplary system (e.g., by artificial intelligence). In a second example, graphical element 2201 may be controlled by a user using an accessory and graphical element 2202 may be controlled by another user using an accessory. In a third example, graphical element 2201 may be controlled by the exemplary system (e.g., by artificial intelligence) and graphical element 2202 may be controlled by a user using an accessory. In a fourth example, both graphical elements 2201 and 2202 may be controlled by the exemplary system (e.g., by artificial intelligence).

The exemplary disclosed apparatus, system, and method may be used in any suitable application for controlling a computing device interaction using an accessory. For example, the exemplary disclosed apparatus, system, and method may be used for controlling a game using an accessory. For example, the exemplary disclosed apparatus, system, and method may be used in any suitable application for controlling a game such as a video game displayed on a user interface, a virtual reality video game, and/or any other game played on a computing device or other suitable user interface. For example, the exemplary disclosed apparatus, system, and method may be used in an erotic game such as an erotic video game. The exemplary disclosed apparatus, system, and method may also be used in any other suitable computing device interaction such as virtual physical therapy, virtual medical clinical work or appointments, virtual massage, and/or any other suitable type of computing device interaction involving tactile contact or stimulation of a body portion. The exemplary disclosed apparatus, system, and method may also be used in a broadcast platform such as a user sending a tip to start a ball dropping from a top to a bottom of a screen, then a model squeezing an adult toy by using his or her body to force the ball to rise up from the bottom to the top of the screen. The exemplary disclosed apparatus, system, and method may also be used for a "number disappearing game" in a broadcast platform such as a model setting up a range of numbers (for example 1-120); when a number disappears, the exemplary adult toy will vibrate based on that number; if a user sends a certain amount of tips (for example 3 tips), then the number (e.g., number 3 in the range of numbers will disappear. If the tip (with a certain number such as 4 tips) that is sent by a user cannot be found in the range of numbers (for example, the number has disappeared because another user has sent 4 tips before), then there may be two choices: choice 1 may be to eliminate or "disappear" a smaller number in the range of number; and choice 2 (e.g., when all those smaller number have been eliminated or "disappeared") may involve accumulating (e.g., adding up) other users' tips to make a bigger number be eliminated or "disappeared." When all the numbers (e.g., from 1-120) have disappeared, the game may end.

Figure 18:
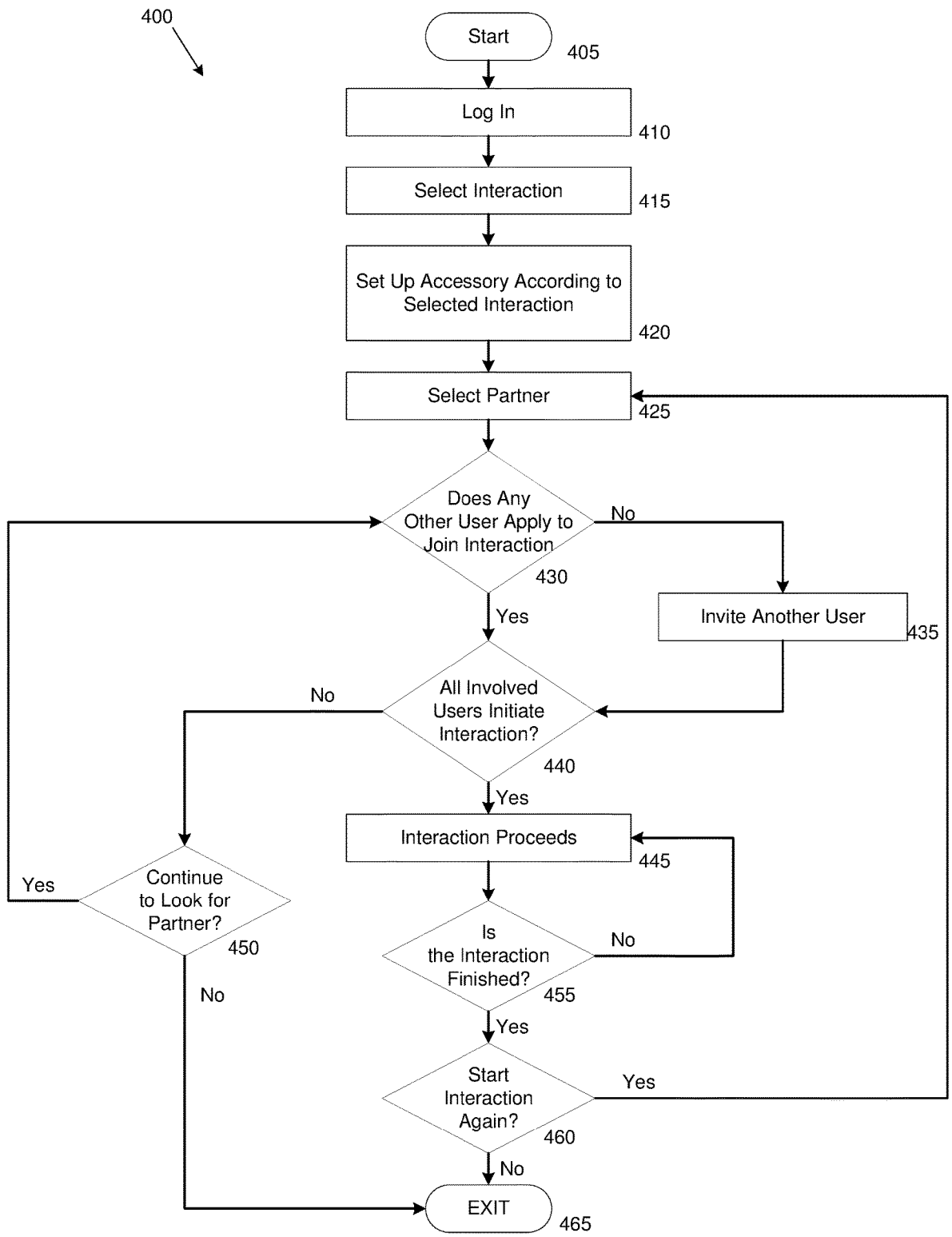
FIG. 18 is a flowchart showing an exemplary process of the present invention.

An exemplary operation of the exemplary disclosed apparatus, system, and method will now be described. For example, FIG. 18 illustrates an exemplary process 400. In at least some exemplary embodiments, process 400 may be a method for providing any suitable type of computing device interaction (e.g., a general game type, a type of physical therapy session, and/or any other desired type of computing device interaction). Process 400 begins at step 405.

At step 410, a user (e.g., user 324 or model 335 that may be an "initiating user") may log in to the exemplary disclosed system (e.g., system 300). At step 415, the user (e.g., via model device 320, user device 322, personal device 325, and/or personal device 326) may select a desired computing device interaction such as, for example, a desired game (e.g., video game). For example, the user may enter input that may be processed by game setting module 340 to set a desired interaction.

At step 420, the user (e.g., via model device 320, user device 322, personal device 325, and/or personal device 326) may configure an exemplary accessory (e.g., accessory 330 or accessory 331) based on the interaction selected at step 415. For example, the user may enter input that may be processed by game instruction module 345 to configure the exemplary disclosed accessory. For example, a user may configure the exemplary accessory to control a game element (e.g., game character 2001 or 2002) to move based on actions taken by the user on the exemplary accessory such as for example as described above regarding FIGS. 15A through 15E. The configuration may also for example be based on predetermined criteria.

At step 425, the user may begin a partner selection process to determine one or more users with which to perform the selected computing interaction (e.g., game). At step 430, the exemplary disclosed system may determine whether or not any other users have applied to join the computing device interaction initiated by the user at step 415. For example, when the user initiates the interaction (e.g., game) at step 415, the exemplary disclosed system may provide a notification to some or all users that the interaction is underway (e.g., may notify "contacts" or "friends" of the initiating user and/or some or all users on the exemplary disclosed system). If the exemplary disclosed system determines that no other users have applied to join the present interaction, the exemplary disclosed system may proceed to step 435.

At step 435, the initiating user may invite other users to join the present interaction. For example, the user may select users from a "friends" or contacts list, based on a search of all users active on the system, and/or any other suitable technique for inviting other users. The system may then proceed to step 440. Also for example, if other users have applied to join the present interaction at step 430, the system may proceed directly to step 440.

At step 440, the exemplary disclosed system may determine whether or not the present interaction should proceed. For example, the exemplary disclosed system may determine whether a game should begin with the initiating user playing with additional users. In at least some exemplary embodiments, the initiating user may accept or decline other users who applied to join the interaction at step 430. Also for example, the system may determine whether other users have accepted or declined the initiating user's invitation sent at step 435. In at least some exemplary embodiments, a predetermined amount of time may pass to allow users to determine whether or not they wish to join the present interaction. Also for example, the interaction may automatically begin when a predetermined number of users have been accepted to join. Further for example, the initiating user may manually begin the interaction (e.g., begin game play, a therapy, a clinical appointment, or any other desired interaction) based on the users who have joined up to a certain point in time. The interaction may then begin at step 445 (e.g., a game may begin).

If at step 440 no other or not enough users (e.g., based on the initiating user's discretion) have been accepted by the initiating user to join, or no other users have accepted the initiating user's invitation at step 435, the initiating user and/or the exemplary disclosed system may decline to initiate the interaction. The system may proceed to step 450, at which the initiating user may be prompted whether or not to continue to search for other participants (e.g., players). If the initiating user enters input to continue to look for partners, the system may return to step 430. If the initiating user enters input not to continue looking for a new partner, process 400 may end at step 465.

If the interaction was initiated at step 445, the interaction (e.g., game) may proceed. As the interaction is underway, the exemplary disclosed system may determine at step 455 whether or not the interaction is finished. If the interaction is not finished, the system may return to step 445 as the interaction is continued (e.g., game play continues). If the exemplary disclosed system determines at step 455 that the interaction is finished, the interaction may end at step 460 (e.g., game play may stop). The exemplary disclosed system may also determine at step 460 whether or not a new interaction should begin (e.g., restart). The system may determine whether or not a new interaction should begin based on input from the initiating user, predetermined criteria (e.g., multiple interactions are to take place), and/or any other suitable criteria. If a new interaction is to take place, the exemplary disclosed system may return to step 425. If a new interaction is not to take place, the exemplary disclosed system may proceed to step 465, ending process 400.

Figure 19:
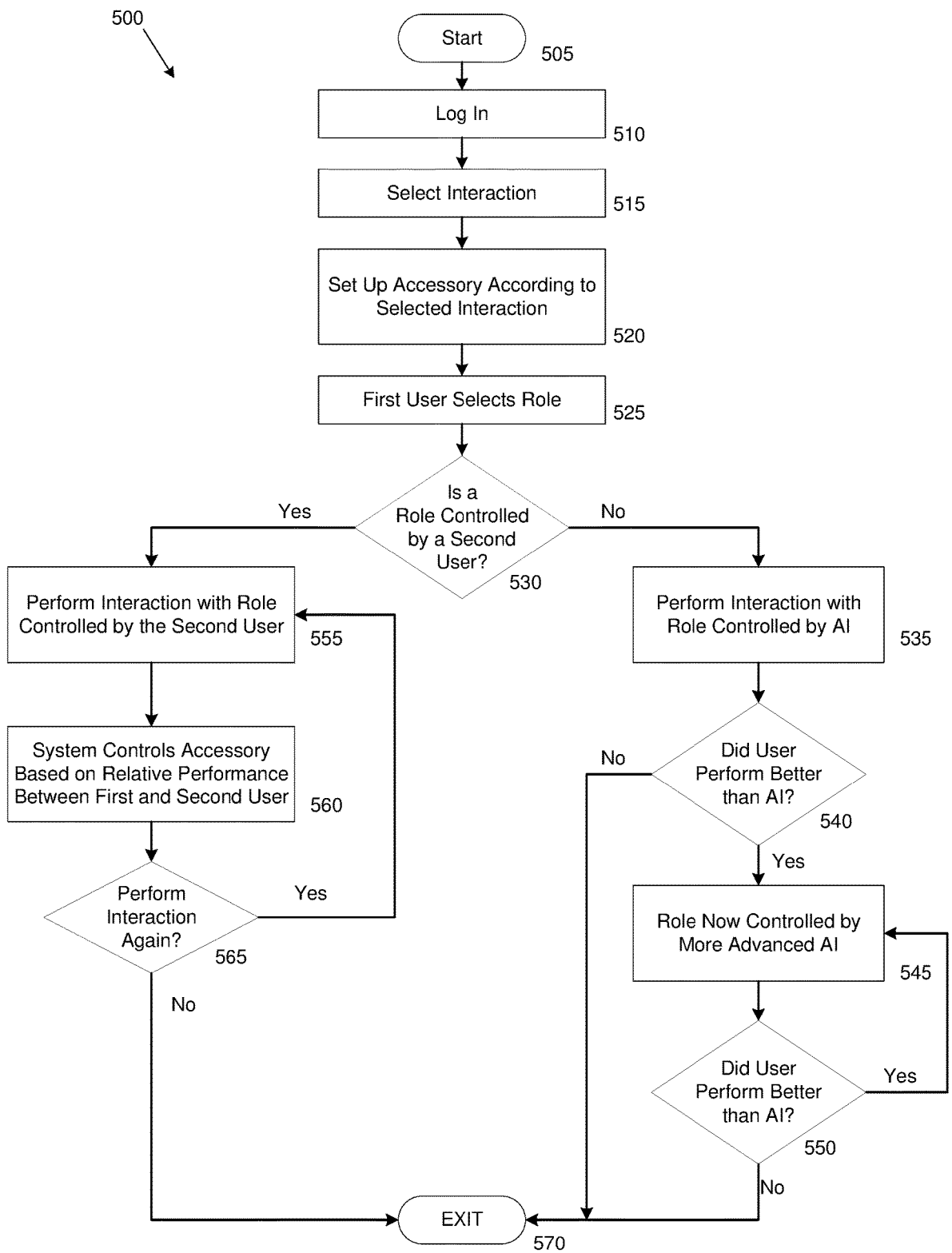
FIG. 19 is a flowchart showing an exemplary process of the present invention.

Another exemplary operation of the exemplary disclosed apparatus, system, and method will now be described. For example, FIG. 19 illustrates an exemplary process 500. In at least some exemplary embodiments, process 500 may be a method for providing any suitable type of computing device interaction such as a fighting game (e.g., fighting video game). Process 500 begins at step 505.

At step 510, a user (e.g., user 324 or model 335 that may be a "first user" or an "initiating user") may log in to the exemplary disclosed system (e.g., system 300). At step 515, the user (e.g., via model device 320, user device 322, personal device 325, and/or personal device 326) may select a desired computing device interaction such as, for example, a fighting game (e.g., a fighting video game). For example, the user may enter input that may be processed by game setting module 340 to set a desired interaction.

At step 520, the user (e.g., via model device 320, user device 322, personal device 325, and/or personal device 326) may configure an exemplary accessory (e.g., accessory 330 or accessory 331) based on the interaction selected at step 515. For example, the user may enter input that may be processed by game instruction module 345 to configure the exemplary disclosed accessory. For example, a user may configure the exemplary accessory to control a game element (e.g., game character 2001 or 2002) to move based on actions taken by the user on the exemplary accessory such as for example as described above regarding FIGS. 15A through 15E. The configuration may also be for example based on predetermined criteria in view of the selected interaction.

At step 525, the user may select a role (e.g., game character such as game character 2001 or 2002, or any other suitable game character) in the interaction (e.g., fighting game). For example, the user may select a game character having a desired body type or size, capabilities, weapons, and/or any other desired attributes.

At step 530, the exemplary disclosed system may determine whether or not another role in the interaction is controlled by a second user (e.g., a human user such as user 324 or model 335). If the exemplary disclosed system determines that a second user (e.g., human user) is not controlling a game character in the interaction, the system may proceed to step 535. At step 535, the interaction (e.g., game such as a fighting game) proceeds with a game character controlled by the initiating or first user and a role controlled by the exemplary disclosed system (e.g., by artificial intelligence).

At step 540, the exemplary disclosed system may determine whether or not the initiating or first user performed better at the interaction (e.g., won the fighting game) than the game character controlled by the artificial intelligence. For example, game result module 350 may determine whether or not the initiating or first user performed better at the game and/or defeated the game character controlled by the artificial intelligence. If the exemplary disclosed system determines that the initiating or first user performed better than (e.g., or performed equal to) the artificial intelligence, the system may proceed to step 545. If the exemplary disclosed system determines that the initiating or first user did not perform better than the artificial intelligence, the system may proceed to step 570, ending process 500.

At step 545, the interaction may continue and/or restart (e.g., start a new game) with more advanced artificial intelligence controlling the game character opposing the initiating or first user. The interaction may proceed (e.g., game play may proceed). At step 550, the exemplary disclosed system may again determine whether or not the initiating or first user performed better at the interaction (e.g., won the fighting game) than the game character controlled by the artificial intelligence. If the exemplary disclosed system determines that the initiating or first user again performed better than (e.g., or performed equal to) the artificial intelligence, the system may return to step 545 (e.g., more advanced artificial intelligence may be provided as an opponent). If the exemplary disclosed system determines that the initiating or first user did not perform better than the artificial intelligence, the system may proceed to step 570, ending process 500.

If the exemplary disclosed system determines at step 530 that a second user (e.g., human user) is controlling a game character in the interaction, the system may proceed to step 555. At step 555, the interaction (e.g., game such as a fighting game) proceeds with a game character controlled by a human user (e.g., user 324 or model 335). Game play between the users may proceed.

At step 560, game result module 350 may determine which user performed better at the interaction, and based on the results, game communication module 355 may control the respective accessories of the winning and losing users as described for example above (e.g., or allow the winning user to control the other accessory of the losing user). For example, game result module 350 may quantify a computing device interaction performance (e.g., measure and quantify a performance of one or more users based on predetermined criteria such as scoring for effective performance in a game). For example, the exemplary disclosed accessories may be controlled by the system and/or winning (e.g., or losing) user based on predetermined criteria and/or as described for example above. For example, accessories may vibrate from strong to weak, weak to strong, and/or be make any other movements or actions as described for example above. For example, the winning user may be provided with more desirable actions by the accessory and more discretion in controlling the accessory. In at least some exemplary embodiments, the winning user may activate the exemplary accessory of the losing player (e.g., to trigger a predetermined action and/or to manually control the accessory as described for example herein) and/or the losing player may be directed by the exemplary system to control the winner's accessory to comfort the winner. In at least some exemplary embodiments, the accessory of the losing user may be activated by the winning player and/or the system may direct the losing player to comfort the winner based on controlling the winner's accessory. Also for example, the losing player may be directed to speak, make utterances, and/or take actions (e.g., that may be recorded by a camera and transmitted to the winner) that may please or comfort the winner.

At step 565, the exemplary system may determine whether or not the interaction will be performed again based on, for example, input from the initiating user and/or other users, predetermined criteria, and/or any other suitable criteria. If the system determines that another interaction should be performed, the system returns to step 555. If the system determines that another interaction should not be performed, the system proceeds to step 570, ending process 500.

Figure 20:
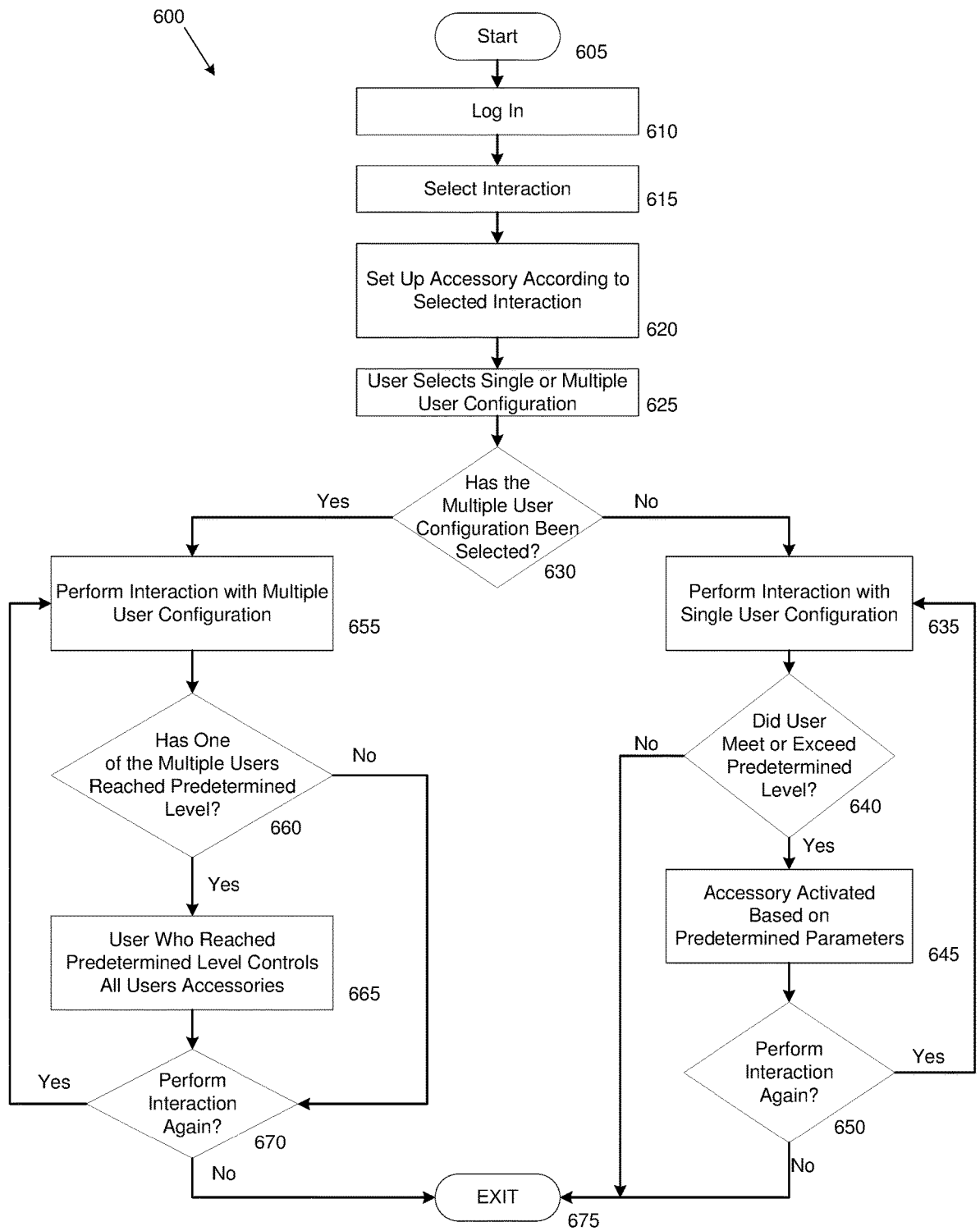
FIG. 20 is a flowchart showing an exemplary process of the present invention.

Another exemplary operation of the exemplary disclosed apparatus, system, and method will now be described. For example, FIG. 20 illustrates an exemplary process 600. In at least some exemplary embodiments, process 600 may be a method for providing any suitable type of computing device interaction such as a passing through game (e.g., passing through video game as described for example above). Process 600 begins at step 605.

At step 610, a user (e.g., user 324 or model 335 that may be a "first user" or an "initiating user") may log in to the exemplary disclosed system (e.g., system 300). At step 615, the user (e.g., via model device 320, user device 322, personal device 325, and/or personal device 326) may select a desired computing device interaction such as, for example, a passing through game (e.g., a passing through or multilevel video game). For example, the user may enter input that may be processed by game setting module 340 to set a desired interaction.

At step 620, the user (e.g., via model device 320, user device 322, personal device 325, and/or personal device 326) may configure an exemplary accessory (e.g., accessory 330 or accessory 331) based on the interaction selected at step 615. For example, the user may enter input that may be processed by game instruction module 345 to configure the exemplary disclosed accessory. For example, a user may configure the exemplary accessory to control a game element (e.g., game character 2001 or 2002) to move based on actions taken by the user on the exemplary accessory such as for example as described above regarding FIGS. 15A through 15E.

At step 625, the user may select a desired game configuration such as single user configuration or a multiple user configuration. At step 630, the exemplary disclosed system may determine whether or not the multiple user configuration has been selected. If the exemplary disclosed system determines that a multiple user configuration has not been selected, the system may proceed to step 635. At step 635, the interaction (e.g., game such as a passing through game) proceeds with a game character controlled by the initiating or first user being controlled in a single user configuration.

At step 640, the exemplary disclosed system may determine whether or not the initiating or first user met or exceeded a predetermined level. The predetermined level may be for example, a predetermined time limit for completing a level or stage of the game, scoring a predetermined number of points, and/or achieving any suitable predetermined threshold that may be set, for example, based on the exemplary disclosed system (e.g., based on high scores of all users, a certain percentage or level derived from aggregate scores, and/or any other suitable criteria). If the exemplary disclosed system determines that the initiating user performed better than (e.g., or performed equal to) the predetermined level or threshold, the system may proceed to step 645. If the exemplary disclosed system determines that the initiating user did not perform better than the predetermined level, the system may proceed to step 675, ending process 600.

At step 645, an accessory of the initiating user (e.g., which the user may use to control a game character as described for example above) may be activated based on predetermined parameters. For example, the exemplary accessory may be controlled in a way to reward or provide comfort to the user if the user met the threshold or may be controlled in a way that is not rewarding to the user if the threshold was not met (e.g., based on an operation of game communication module 355). For example, the accessory may vibrate from strong to weak, weak to strong, and/or be make any other movements or actions as described for example above. For example, the winning user may be provided with more desirable actions by the accessory and more discretion in controlling the accessory.

At step 650, the exemplary system may determine whether or not the interaction will be performed again based on, for example, input from the initiating user, predetermined criteria, and/or any other suitable criteria. If the system determines that another interaction should be performed, the system returns to step 635. If the system determines that another interaction should not be performed, the system proceeds to step 675, ending process 600.

If the exemplary disclosed system determines at step 630 that a multiple user configuration has been selected, the system may proceed to step 655. At step 655, the interaction (e.g., game such as a passing through game) may proceed with a game character controlled by multiple users (e.g., multiple human and/or artificial intelligence users). Game play between the users may proceed.

At step 660, game result module 350 may determine if one of the users has reached the predetermined level (e.g., first to reach) and/or scored the predetermined amount of points (e.g., before all players have "died" or run out of energy). For example, game result module 350 may quantify a computing device interaction performance (e.g., measure and quantify a performance of one or more users based on predetermined criteria such as scoring for effective performance in a game). If one of the users has reached the predetermined level, the system may proceed to step 665. Game communication module 355 may control the respective accessories of the winning and losing users as described for example above (e.g., or allow the winning user to control the other accessory of the losing user). For example, the winning user may be allowed to control the accessories of the remaining users. For example, accessories may vibrate from strong to weak, weak to strong, and/or be make any other movements or actions as described for example above. For example, the winning user may be provided with more desirable actions by the accessory and more discretion in controlling the accessory. In at least some exemplary embodiments, the winning user may be allowed by the exemplary disclosed system to activate the accessories of other users based on the winning user's discretion and/or may direct (e.g., or the system may direct) the other players to comfort the winner via the winner's accessory and/or taking other desired actions.

At step 670, the exemplary system may determine whether or not the interaction will be performed again based on, for example, input from the initiating user and/or other users, predetermined criteria, and/or any other suitable criteria. Also for example, the system may proceed directly from step 660 to step 670 is the exemplary system determines that no user has achieved the predetermined level at step 660. At step 670, if the system determines that another interaction should be performed, the system returns to step 655. If the system determines that another interaction should not be performed, the system proceeds to step 675, ending process 600.

Figure 21:
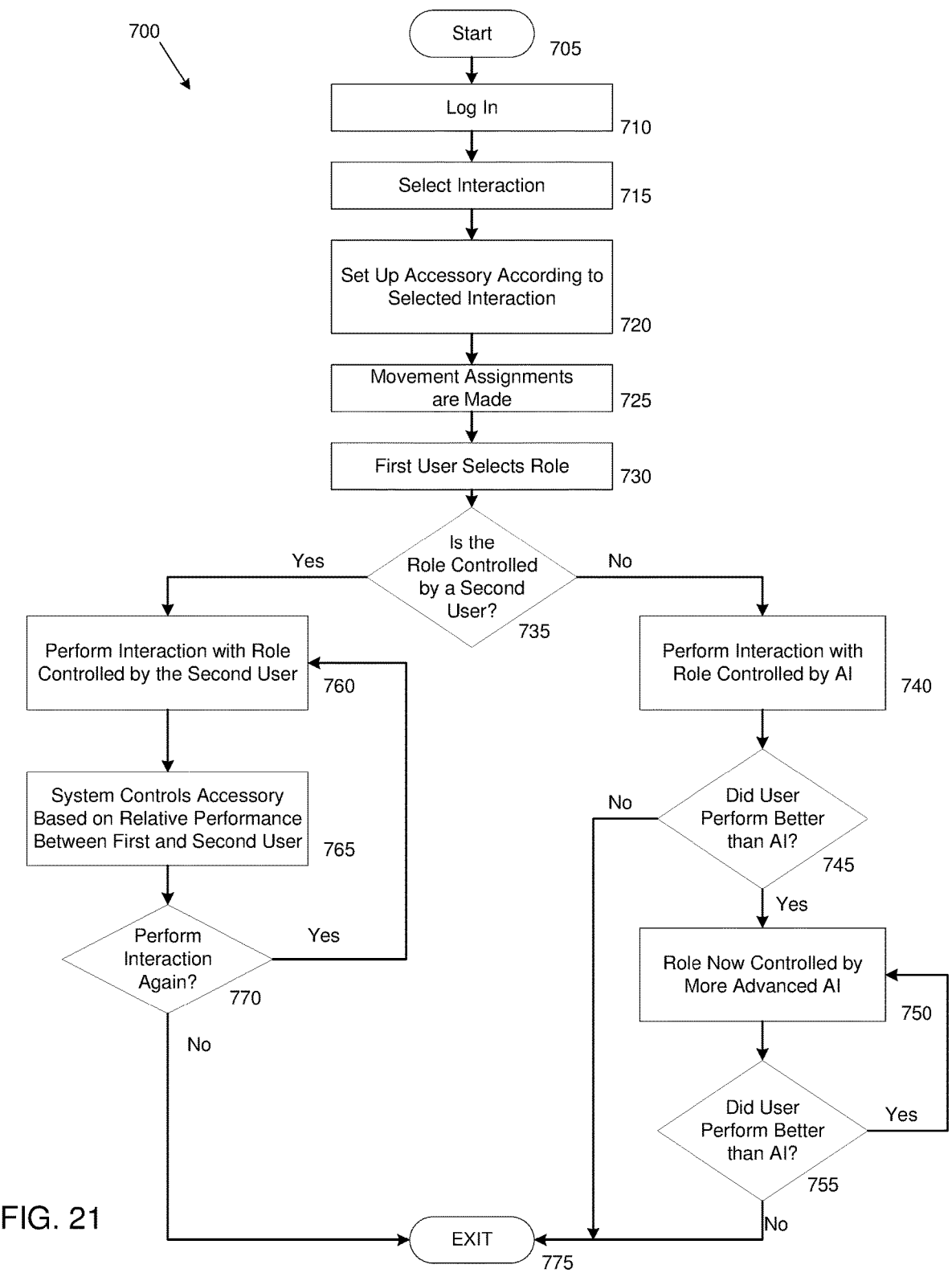
FIG. 21 is a flowchart showing an exemplary process of the present invention.

Another exemplary operation of the exemplary disclosed apparatus, system, and method will now be described. For example, FIG. 21 illustrates an exemplary process 700. In at least some exemplary embodiments, process 700 may be a method for providing any suitable type of computing device interaction such as a sports game (e.g., sports video game). Process 700 begins at step 705.

At step 710, a user (e.g., user 324 or model 335 that may be a "first user" or an "initiating user") may log in to the exemplary disclosed system (e.g., system 300). At step 715, the user (e.g., via model device 320, user device 322, personal device 325, and/or personal device 326) may select a desired computing device interaction such as, for example, a sports game (e.g., a sports video game). For example, the user may enter input that may be processed by game setting module 340 to set a desired interaction.

At step 720, the user (e.g., via model device 320, user device 322, personal device 325, and/or personal device 326) may configure an exemplary accessory (e.g., accessory 330 or accessory 331) similar to at step 520.

At step 725, the user may make movement assignments. The accessory may be configured to make some movements at step 720, and another control device (e.g., a control such as a smart band, glove, or other suitable control device) may be configured to make other movements in the sports game.

At step 730, the user may select a role (e.g., similar to step 525). At step 735, the exemplary disclosed system may determine whether or not another role in the interaction is controlled by a second user (e.g., a human user such as user 324 or model 335). If the exemplary disclosed system determines that a second user (e.g., human user) is not controlling a game character in the interaction, the system may proceed to step 740. At step 740, the interaction (e.g., game such as a sports game) proceeds with a game character controlled by the initiating or first user and a role controlled by the exemplary disclosed system (e.g., by artificial intelligence).

At step 745, the exemplary disclosed system may determine whether or not the initiating or first user performed better at the interaction (e.g., won the fighting game) than the game character controlled by the artificial intelligence (e.g., similar to step 540). If the exemplary disclosed system determines that the initiating or first user performed better than (e.g., or performed equal to) the artificial intelligence, the system may proceed to step 750. If the exemplary disclosed system determines that the initiating or first user did not perform better than the artificial intelligence, the system may proceed to step 775, ending process 700.

At step 750, the interaction may continue and/or restart (e.g., start a new game) with more advanced artificial intelligence controlling the game character opposing the initiating or first user. The interaction may proceed (e.g., game play may proceed). At step 755, the exemplary disclosed system may again determine whether or not the initiating or first user performed better at the interaction (e.g., won the sports game) than the game character controlled by the artificial intelligence. If the exemplary disclosed system determines that the initiating or first user again performed better than (e.g., or performed equal to) the artificial intelligence, the system may return to step 750 (e.g., more advanced artificial intelligence may be provided as an opponent). If the exemplary disclosed system determines that the initiating or first user did not perform better than the artificial intelligence, the system may proceed to step 775, ending process 700.

If the exemplary disclosed system determines at step 735 that a second user (e.g., human user) is controlling a game character in the interaction, the system may proceed to step 760. At step 760, the interaction (e.g., game such as a sports game) proceeds with a game character controlled by a human user (e.g., user 324 or model 335). Game play between the users may proceed.

At step 765, game result module 350 may determine which user performed better at the interaction, and based on the results, game communication module 355 may control the respective accessories of the winning and losing users as described for example above (e.g., or allow the winning user to control the other accessory of the losing user). For example, the exemplary disclosed accessories may be controlled similar to as described above at step 560. Also for example, the losing player or players may be directed to speak, make utterances, and/or take actions (e.g., that may be recorded by a camera and transmitted to the winner) that may please or comfort the winner.

At step 770, the exemplary system may determine whether or not the interaction will be performed again based on, for example, input from the initiating user and/or other users, predetermined criteria, and/or any other suitable criteria. If the system determines that another interaction should be performed, the system returns to step 760. If the system determines that another interaction should not be performed, the system proceeds to step 775, ending process 700.

In at least some exemplary embodiments, the exemplary disclosed method may include selecting a computing device interaction, configuring a user accessory (e.g., accessory 330 or accessory 331) based on the selected computing device interaction, performing the computing device interaction using the configured user accessory, quantifying a computing device interaction performance of one or more users, and controlling the user accessory based on quantifying the computing device interaction performance. A body part of one of the one or more users may be inserted into or received by the user accessory. The user accessory may be an adult sex toy. The user accessory may be selected from the group consisting of a dildo and a sleeve. The computing device interaction may be a video game selected from the group consisting of a sports game, a fighting game, and a multi-level passing through game. The method may further include transferring invitation data to one or more users requesting the one or more users to join a computing device interaction that is a video game selected by an initiating user. Quantifying the computing device interaction performance of the one or more users may include comparing the computing device interaction performance to artificial intelligence performance. Controlling the user accessory may include vibrating the user accessory. Performing the computing device interaction using the configured user accessory may be playing a video game by using the configured user accessory to control a game character. The configured user accessory may be a sleeve and controlling the game character may include inserting a genital body part of a user into the sleeve to varying depths. The configured user accessory may be a dildo and controlling the game character may include inserting the dildo to varying depths in a genital body part of a user.

In at least some exemplary embodiments, the exemplary disclosed system may include a game module (e.g., game setting module 340, game instruction module 345, game result module 350, and/or game communication module 355), comprising computer-executable code stored in non-volatile memory, a processor, and a user accessory (e.g., accessory 330 or accessory 331). The game module, the processor, and the user accessory may be configured to receive user input data selecting a video game, configure the user accessory based on the selected video game, provide user control of a video game character based on user input data provided via the configured user accessory, quantify game performance of a first user and a second user, and control the user accessory based on quantifying the game performance. A genital body part of the first user may be inserted into or received by the user accessory. The exemplary disclosed system may further include a user device that communicates with the user accessory, the user device being selected from the group consisting of a desktop computer, a laptop computer, a smartphone, and a tablet. The exemplary disclosed system may further include a smartphone that communicates with the user accessory, the smartphone also communicating with at least one of a desktop computer and a cloud server. The exemplary disclosed system may further include a first user device and a second user device, the first user device communicating with the user accessory of the first user, and the second user device communicating with a second user accessory of the second user. The first user device and the second user device may be paired smartphones. The first user device and the second user device may transfer data to a chat room hosted on a WAN, the selected video game being broadcast to a plurality of users via the WAN. The user accessory may be selected from the group consisting of a dildo and a genital body part sleeve.

In at least some exemplary embodiments, the exemplary disclosed method may include selecting a video game, configuring an adult sex toy based on the selected video game, providing user control of a video game character based on user input data provided via the configured adult sex toy, quantifying a video game performance of one or more users, and controlling the adult sex toy based on quantifying the video game performance. The user input data provided via the configured adult sex toy may be based on a body part of one of the one or more users being inserted into or received by the adult sex toy. Controlling the adult sex toy may include vibrating the user accessory. The video game character may be a baffle (e.g., graphical element 2201 or graphical element 2202) that may be movable based on the user input data provided by the configured adult sex toy, the baffle movable to block a video game ball (e.g., graphical element 2203 or graphical element 2204).

The exemplary disclosed apparatus, system, and method may provide an efficient technique for controlling a computing device interaction using an accessory. The exemplary disclosed apparatus, system, and method may provide an efficient technique for allowing a user (or a system and/or a neural network) to control an accessory attached to a user to clinically treat, massage, stimulate, or contact the user in any desired manner. The exemplary disclosed apparatus, system, and method may also allow a plurality of users and/or a neural network to control an accessory attached to one or more other users to provide an efficient technique for allowing a given user (or a system and/or a neural network) to control an accessory attached to another user to clinically treat, massage, stimulate, or contact that user in any desired manner.

In at least some exemplary embodiments, the exemplary disclosed apparatus, system, and method may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

Figure 22:
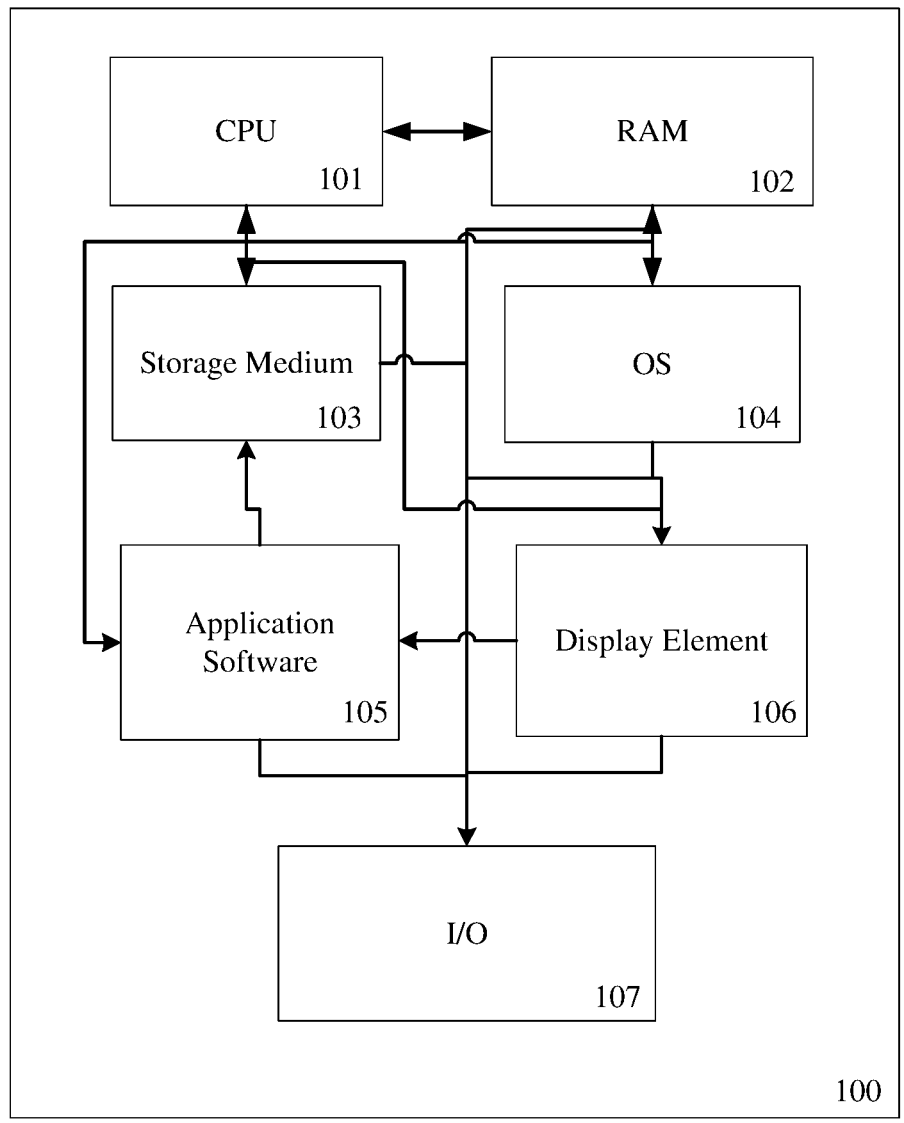
FIG. 22 is a schematic illustration of an exemplary computing device, in accordance with at least some exemplary embodiments of the present disclosure.

An illustrative representation of a computing device appropriate for use with embodiments of the system of the present disclosure is shown in FIG. 22. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 23, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 23:
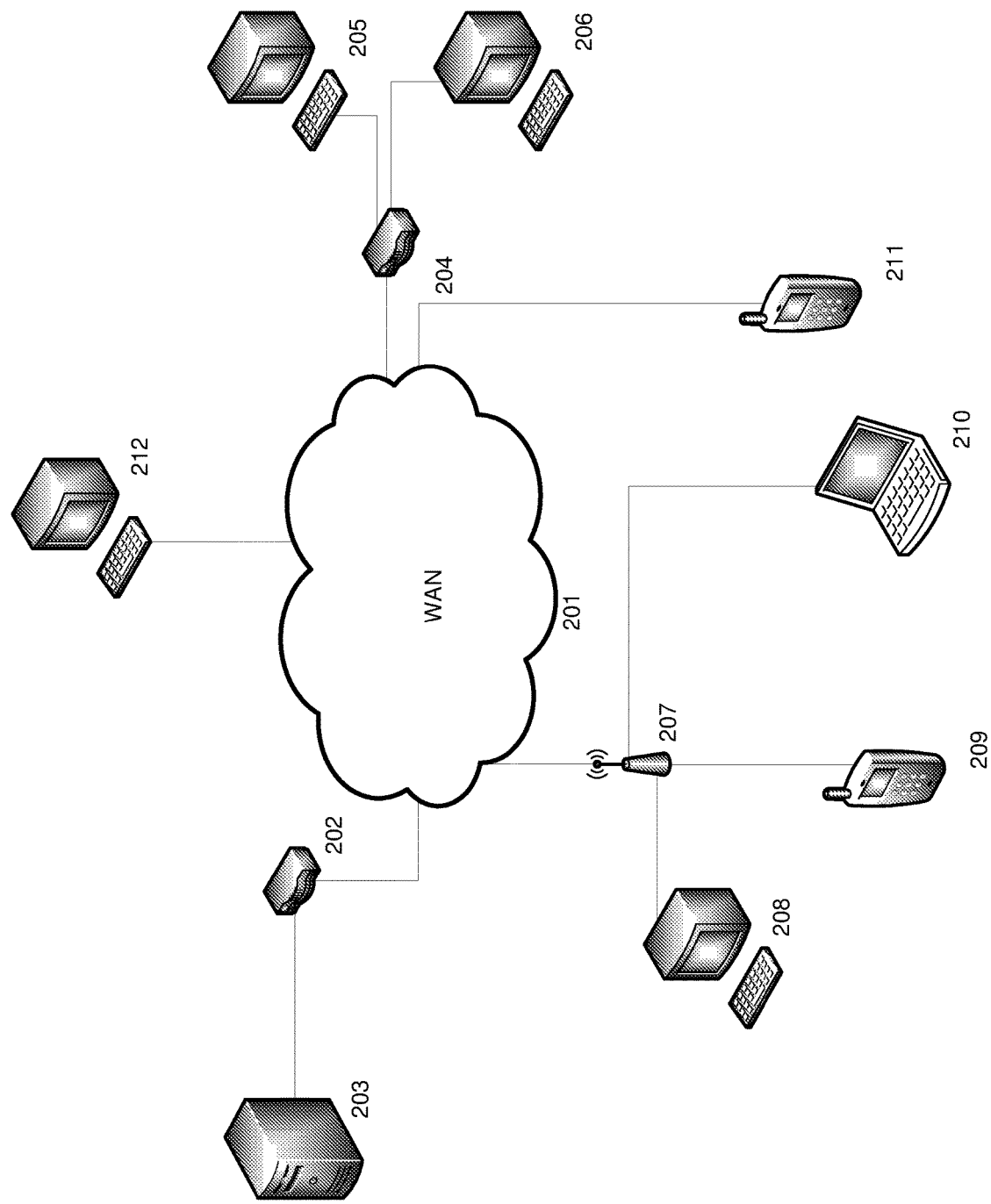
FIG. 23 is a schematic illustration of an exemplary network, in accordance with at least some exemplary embodiments of the present disclosure.

Referring to FIG. 23, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 23, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A method, comprising:
providing a computing device interaction;
configuring a sex toy with at least one sensor based on the provided computing device interaction;
controlling a first virtual object, based on an operation on the configured sex toy performed by a first user, to challenge against a second virtual object in the computing device interaction;
quantifying a computing device interaction performance of the first user based on the control of the first virtual object challenging against the second virtual object; and
controlling the sex toy based on quantifying the computing device interaction performance;
wherein a body part of the first user is inserted into or received by the sex toy, and controlling the first virtual object includes controlling the first virtual object to perform a predefined action based on motion data detected by the at least one sensor of the configured sex toy, which is associated with the operation on the configured sex toy performed by the first user; and
wherein the first user is communicated with a second user controlling the second virtual object through an online application platform, and the computing device interaction is presented on the online application platform.

2. The method of claim 1, wherein the motion data detected by at least one sensor of the configured sex toy includes at least one of squeeze operation data, orientation data, time data and depth data detected by the sensor of the configured sex toy.

3. The method of claim 1, wherein controlling the sex toy based on quantifying the computing device interaction performance includes controlling the sex toy to perform a preset stimulation action based on result data of quantifying the first virtual object challenging against the second virtual object.

4. The method of claim 3, wherein the result data of quantifying the first virtual object challenging against the second virtual object includes quantifying whether the first virtual object hits the second virtual object or whether the first virtual object avoids the second virtual object.

5. The method of claim 1, wherein at least one of the first virtual object and the second virtual object is associated with input data of the second user.

6. The method of claim 1, wherein at least one of the first virtual object and the second virtual object is configured to appear or be generated based on receipt of input data from the second user.

7. The method of claim 1, wherein at least one of the first virtual object and the second virtual object is configured to configure its properties based on receipt of input data from the second user.

8. The method of claim 1, wherein controlling the sex toy based on quantifying the computing device interaction performance includes controlling the sex toy based on receipt of control input from the second user, who obtains control authority for the sex toy based on quantifying the computing device interaction performance.

9. The method of claim 1, wherein the second user is configured to be a human or artificial intelligence.

10. The method of claim 1, wherein the second virtual object is configured to be controlled or generated by the second user when the second user tips the first user.

11. The method of claim 10, wherein the difficulty of the computing device interaction is related to the amount of the second user's tip to the first user.

12. The method of claim 1, wherein the sensor of the configured sex toy is a gyro sensor, and controlling the first virtual object to perform a predefined action includes controlling the first virtual object to move in a corresponding direction based on motion data detected by the gyro sensor of the configured sex toy, which is associated with the tilt direction of the first user's body.

13. The method of claim 1, wherein the sensor of the configured sex toy is a pressure sensor, and controlling the first virtual object to perform a predefined action includes controlling the first virtual object to hit the second virtual object or controlling the first virtual object to become small to avoid the second virtual object, based on squeeze operation data detected by the pressure sensor of the configured sex toy.

14. A system, comprising:
a non-volatile memory, comprising computer-executable code stored in the non-volatile memory; and at least one processor;
wherein, the computer-executable code, when operating on the at least on processor, causes the system to:
provide a computing device interaction;
configure a sex toy with at least one sensor based on the provided computing device interaction;
control a first virtual object, based on an operation on the configured sex toy performed by a first user, to challenge against a second virtual object in the computing device interaction;
quantify a computing device interaction performance of the first user based on the control of the first virtual object challenging against the second virtual object; and
control the sex toy based on quantifying the computing device interaction performance;
wherein a body part of the first user is inserted into or received by the sex toy, and controlling the first virtual object includes controlling the first virtual object to perform a predefined action based on motion data detected by the at least one sensor of the configured sex toy, which is associated with the operation on the configured sex toy performed by the first user; and
wherein the first user is communicated with a second user controlling the second virtual object through an online application platform, and the computing device interaction is presented on the online application platform.

15. The system of claim 14, wherein the motion data detected by at least one sensor of the configured sex toy includes at least one of squeeze operation data, orientation data, time data and depth data detected by the sensor of the configured sex toy.

16. The system of claim 14, wherein controlling the sex toy based on quantifying the computing device interaction performance includes controlling the sex toy to perform a preset stimulation action based on result data of quantifying the first virtual object challenging against the second virtual object.

17. The system of claim 14, wherein at least one of the first virtual object and the second virtual object is associated with input data of the second user.

18. The system of claim 14, wherein at least one of the first virtual object and the second virtual object is configured to appear or be generated based on receipt of input data from the second user.

19. The system of claim 14, wherein the second virtual object is configured to be controlled or generated by the second user when the second user tips the first user.

20. A non-transitory computer-readable storage medium, comprising machine-readable instructions, the machine-readable instructions when executed by a processor of a controller, enabling the controller to:

provide a computing device interaction;

configure a sex toy with at least one sensor based on the provided computing device interaction;

control a first virtual object, based on an operation on the configured sex toy performed by a first user, to challenge against a second virtual object in the computing device interaction;

quantify a computing device interaction performance of the first user based on the control of the first virtual object challenging against the second virtual object; and control the sex toy based on quantifying the computing device interaction performance;

wherein a body part of the first user is inserted into or received by the sex toy, and controlling the first virtual object includes controlling the first virtual object to perform a predefined action based on motion data detected by the at least one sensor of the configured sex toy, which is associated with the operation on the configured sex toy performed by the first user; and wherein the first user is communicated with a second user controlling the second virtual object through an online application platform, and the computing device interaction is presented on the online application platform.

* * * * *